(12) United States Patent
Mallette et al.

(10) Patent No.: US 7,802,645 B2
(45) Date of Patent: Sep. 28, 2010

(54) ARTICULATED SUSPENSION ASSEMBLY FOR A TRACKED VEHICLE

(75) Inventors: Bertrand Mallette, Rock-Forest (CA); Pascal Gagnon, Valcourt (CA); Mario Cote, Racine (CA)

(73) Assignee: Bombardier Recreational Products Inc., Valcourt (CA)

( * ) Notice: Subject to any disclaimer, the term of this patent is extended or adjusted under 35 U.S.C. 154(b) by 339 days.

(21) Appl. No.: 11/844,603

(22) Filed: Aug. 24, 2007

(65) Prior Publication Data
US 2009/0050390 A1 Feb. 26, 2009

(51) Int. Cl.
*B62M 27/02* (2006.01)
(52) U.S. Cl. ...................................... 180/190; 180/9.52
(58) Field of Classification Search .................. 180/186, 180/190, 191, 193, 9.5–9.64
See application file for complete search history.

(56) References Cited

U.S. PATENT DOCUMENTS

| | | | | |
|---|---|---|---|---|
| 3,692,132 A | * | 9/1972 | Pollanen | 180/193 |
| 4,987,965 A | * | 1/1991 | Bourret | 180/193 |
| 6,206,124 B1 | * | 3/2001 | Mallette et al. | 180/193 |
| 6,889,987 B2 | * | 5/2005 | Ouellette | 280/9 |
| 2005/0016784 A1 | * | 1/2005 | Fecteau | 180/182 |

* cited by examiner

*Primary Examiner*—Kevin Hurley
(74) *Attorney, Agent, or Firm*—Osler, Hoskin & Harcourt LLP

(57) ABSTRACT

A suspension assembly for a vehicle having an endless drive track is disclosed. The suspension assembly has a slide frame assembly and a rail extension assembly pivotably connected to a rear portion of the slide frame assembly and pivots about a first axis. The rail extension assembly is pivotable between a raised position and a lowered position with respect to the slide frame assembly. A spring biases the rail extension assembly toward the lowered position. The magnitude of the biasing force of the spring is adjustable. The rail extension assembly can be prevented from pivoting from the lowered position to the raised position independently of the magnitude of the biasing force.

6 Claims, 9 Drawing Sheets

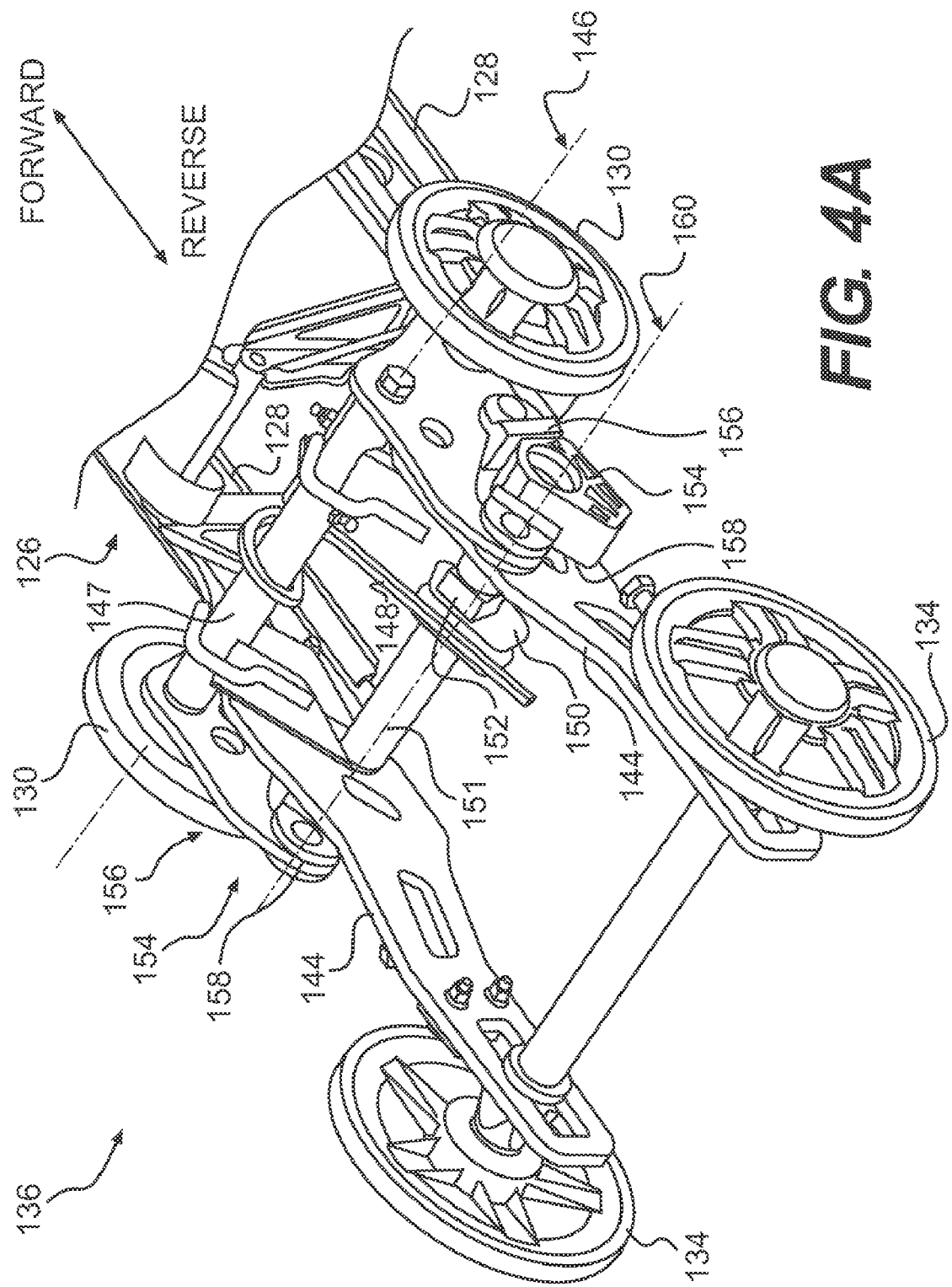

ARTICULATED SUSPENSION ASSEMBLY FOR A TRACKED VEHICLE

FIELD OF THE INVENTION

The present invention relates to suspension assemblies for tracked vehicles.

BACKGROUND OF THE INVENTION

Conventionally, the rear suspension of a snowmobile supports an endless track that is driven by the engine to power the snowmobile. The endless track is tensioned to surround a pair of parallel slide rails, a plurality of idler wheels, and at least one drive wheel or sprocket. A shock absorbing mechanism involving compressed springs and hydraulic dampers urges the slide frame assembly away from the chassis (also known as a frame) of the snowmobile against the weight supported above the suspension in a static condition.

When a snowmobile is driven in reverse, particularly on soft snow, the rear portion of the track can dig into the snow and cause the vehicle to become stuck. Traditionally, the rear suspensions of utility snowmobiles are provided with a rear articulated portion that can pivot upward against a biasing force when sufficient force is applied to that portion of the rail. The articulation of the rear portion provides a ramp so that when the vehicle is reversing in soft snow, the vehicle is continuously being pushed to the top of the snow and prevents the snowmobile from becoming stuck.

The magnitude of the biasing force is adjustable, so that the suspension system can be adapted to different types of terrain. Softer snow generally requires a smaller biasing force, so that the articulated portion can be pushed upward by the reduced force that is exerted by the softer snow. Harder snow generally requires a greater biasing force, so that the articulated portion can assist in providing improved traction.

FIG. 1 illustrates the rear portion of a prior art rear suspension system 10. The forward direction of travel of the vehicle is indicated by the arrow. The suspension system 10 includes a slide frame assembly 12 consisting of two generally parallel slide rails 14 and a plurality of wheels 16. The slide frame assembly 12 defines a path over which an endless track (not shown) travels to propel the vehicle. An articulated portion 18 is connected to the slide frame assembly 12 so as to allow the articulated portion 18 to pivot about an axis 20. The articulated portion 18 has two extension arms 22 and a number of idler wheels 24. The idler wheels 24 serve to further define the path for the endless track.

The articulated portion 18 is biased in a lowered position by a pair of Belleville springs 26, each consisting of a stack of Belleville washers 28. When the vehicle is operated in the reverse direction, forces exerted on the articulated portion 18 can cause it to pivot to a raised position, thereby compressing the springs 26. The biasing force of the springs 26 can be adjusted by tightening or loosening the nuts 30 so that the springs 26 are more or less compressed when the articulated portion 18 is in the lowered position.

While this assembly works, it presents a number of disadvantages. Adjusting the biasing force by using the nuts 30 to compress the springs 26 is time-consuming and difficult, making it inconvenient for a rider to make adjustments "on the fly" as he encounters different terrain. It is also difficult to calibrate the two springs 26 such that they provide the same degree of biasing force.

In addition, in certain situations the rider may desire the articulated portion 18 to remain in the lowered position, for example while using the snowmobile to tow heavy loads in the forward direction. If the articulated portion 18 is in the lowered position, a greater length of track is in contact with the ground, resulting in increased traction and improved towing performance. The only way to cause the articulated portion 18 to remain in the lowered position is to substantially fully compress the springs 26 such that they permit little or no upward pivoting of the articulated portion 18. Compressing the springs 26 to this degree requires exerting more torque on the nuts 30 than a person can comfortably exert, so a rider attempting to do so will generally not succeed in fully compressing the springs 26. Because the springs 26 can still be further compressed if a sufficient force is exerted on them, this method will not always maintain the rear portion 18 in the lowered position, resulting in reduced traction on harder terrain. In addition, once an attempt has been made to tighten the springs 26 to this degree, restoring the springs 26 to their previous degree of bias requires re-calibrating the two springs 26, with all the attendant difficulties noted above.

In recent years, some all-terrain vehicles (ATVs) have been equipped with endless track drive systems to adapt them for use in snowy conditions. Thus, ATVs could also benefit from improvements in suspension assemblies for tracked vehicles.

Therefore, there is a need for an improved suspension system for tracked vehicles with an articulated rear portion that is biased toward a lowered position and that has an adjustable biasing force.

There is also a need for an improved suspension system for tracked vehicles with an articulated rear portion that is biased toward a lowered position and that can be conveniently locked in position.

SUMMARY OF THE INVENTION

It is an object of the present invention to ameliorate at least some of the inconveniences present in the prior art.

It is also an object of the present invention to provide a suspension system for a tracked vehicle with an articulated rear portion that is biased toward a lowered position and that has an adjustable biasing force.

It is also an object of the present invention to provide a suspension system for a tracked vehicle with an articulated rear portion that is biased toward a lowered position and that can be locked in position independently of the magnitude of the biasing force.

One aspect of the present invention provides a suspension assembly for a vehicle having a chassis and an endless drive track. The suspension assembly comprises a suspension arm having a first end and a second end. The first end of the suspension arm is pivotally connectable to the chassis. A slide frame assembly is pivotally connected to the second end of the suspension arm. At least one shock absorber assembly is pivotally connected to the slide frame assembly. The at least one shock absorber assembly biases the slide frame assembly away from the chassis. The suspension assembly comprises a rail extension assembly comprising at least one extension arm. The at least one extension arm has a front end. The front end of the at least one extension arm is pivotally connected to a rear portion of the slide frame assembly about a first axis. The rail extension assembly is pivotable between a raised position and a lowered position with respect to the slide frame assembly about the first axis. At least one rear idler wheel is pivotally connected to a rear portion of the rail extension assembly for guiding the endless drive track. At least one adjustment cam is pivotally connected to the rail extension assembly about a second pivot axis. At least one spring abuts against the at least one adjustment cam. The at least one spring biases the rail extension assembly toward the lowered position. The at least one adjustment cam is pivotable about the second axis between a first position and a second position to adjust a magnitude of a biasing force of the spring.

In a further aspect, at least one blocking cam is mounted to one of the slide frame assembly and the rail extension assembly. At least one stopper is mounted to the other of the slide frame assembly and the rail extension assembly. When the rail extension assembly is in the lowered position, the at least one blocking cam is movable between: a first position, where the at least one blocking cam prevents the rail extension assembly from pivoting to the raised position; and a second position, where the at least one blocking cam does not prevent the rail extension assembly from pivoting to the raised position. When the at least one blocking cam is in the second position and the rail extension assembly is in the raised position, the at least one blocking cam abuts against the at least one stopper.

In a further aspect, the at least one blocking cam is mounted to the rail extension assembly and the at least one stopper is mounted to the slide frame assembly.

In a further aspect, the at least one stopper is at least one upper stopper. The suspension assembly further comprises at least one lower stopper mounted to the slide frame assembly. When the rail extension assembly is in the lowered position the at least one blocking cam abuts against the at least one lower stopper.

In a further aspect, the at least one blocking cam comprises two laterally spaced blocking cams. The at least one stopper comprises two laterally spaced stoppers corresponding to the two laterally spaced blocking cams.

In a further aspect, the stoppers are made at least in part from an elastomeric material.

In a further aspect, the second axis is parallel to the first axis.

In a further aspect, the suspension assembly is incorporated in a snowmobile.

Another aspect of the present invention provides a suspension assembly for a vehicle having a chassis and an endless drive track. The suspension assembly comprises a suspension arm having a first end and a second end. The first end of the suspension arm is pivotally connectable to the chassis. A slide frame assembly is pivotally connected to the second end of the suspension arm. At least one shock absorber assembly is pivotally connected to the slide frame assembly. The at least one shock absorber assembly biases the slide frame assembly away from the chassis. The suspension assembly comprises a rail extension assembly comprising at least one extension arm. The at least one extension arm has a front end. The front end of the at least one extension arm is pivotally connected to a rear portion of the slide frame assembly about a first axis. The rail extension assembly is pivotable between a raised position and a lowered position with respect to the slide frame assembly about the first axis. At least one rear idler wheel is pivotably connected to a rear portion of the rail extension assembly for guiding the endless drive track. At least one spring biases the rail extension assembly toward the lowered position by exerting thereon a biasing force. The suspension assembly comprises a first movable member. The first movable member is movable between a first position and a second position to adjust a magnitude of the biasing force. The suspension assembly comprises a second movable member. The second movable member is movable between a first position and a second position to prevent the rail extension assembly from pivoting from the lowered position to the raised position independently of the magnitude of the biasing force.

In a further aspect, the second movable member is at least one blocking cam mounted to one of the slide frame assembly and the rail extension assembly. The suspension assembly further comprises at least one stopper mounted to the other of the slide frame assembly and the rail extension assembly. When the rail extension assembly is in the lowered position, the at least one blocking cam is movable between: a first position, where the at least one blocking cam prevents the rail extension assembly from pivoting to the raised position; and a second position, where the at least one blocking cam does not prevent the rail extension assembly from pivoting to the raised position. When the at least one blocking cam is in the second position and the rail extension assembly is in the raised position, the at least one blocking cam abuts against the at least one stopper.

In a further aspect, the at least one blocking cam is mounted to the rail extension assembly and the at least one stopper is mounted to the slide frame assembly.

In a further aspect, the at least one stopper is at least one upper stopper. The suspension assembly further comprises at least one lower stopper mounted to the slide frame assembly. When the rail extension assembly is in the lowered position the at least one blocking cam abuts against the at least one lower stopper.

In a further aspect, the at least one blocking cam comprises two laterally spaced blocking cams. The at least one stopper comprises two laterally spaced stoppers corresponding to the two laterally spaced blocking cams.

In a further aspect, the stoppers are made at least in part from an elastomeric material.

In a further aspect, the suspension assembly is incorporated in a snowmobile.

For purposes of this application, terms related to spatial orientation or direction such as "forward" and "rearward" should be understood as they would normally be understood by a rider of the vehicle while sitting on the vehicle in a normal riding position.

Embodiments of the present invention each have at least one of the above-mentioned aspects, but do not necessarily have all of them. It should be understood that some aspects of the present invention that have resulted from attaining the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENT

A rear suspension system in accordance with an embodiment of the present invention will be described with respect to its use in snowmobiles. It is contemplated that the present invention could also be applied to other types of tracked vehicles, such as ATVs that are equipped with tracks to adapt them for use on snowy terrain.

Figure 1:
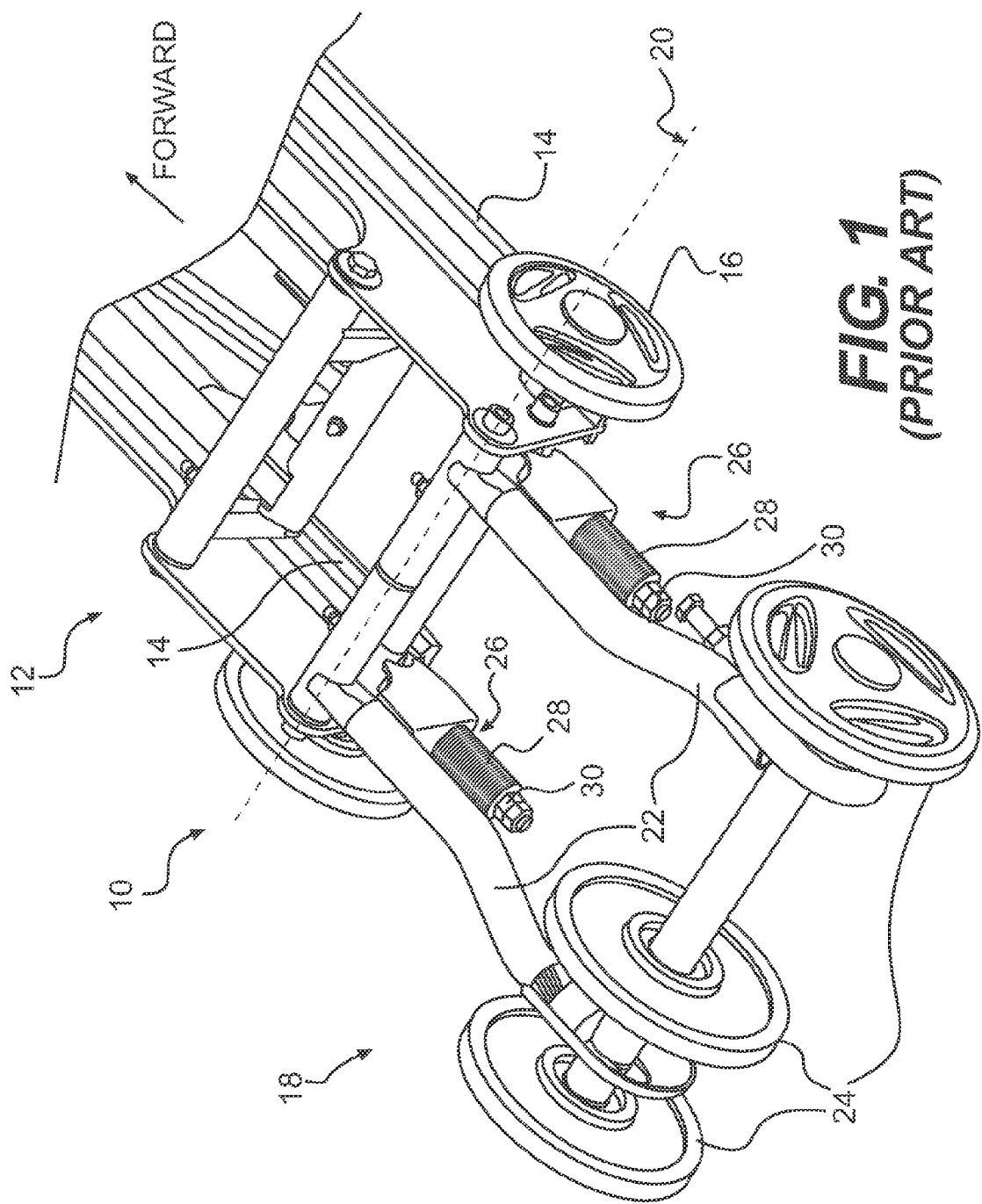
FIG. 1 is a perspective view of a rear portion of a prior art rear suspension system for a snowmobile.
Figure 2:
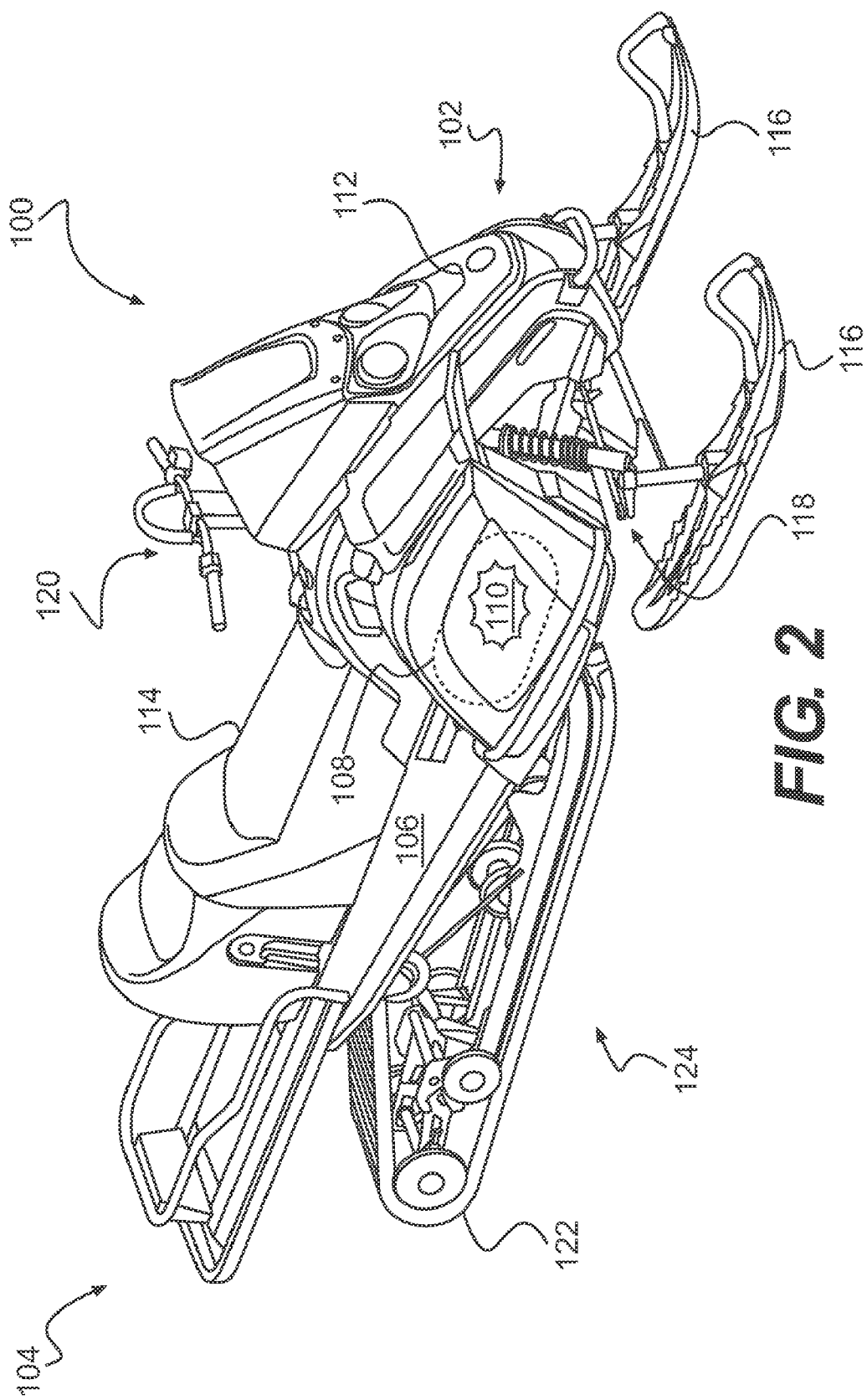
FIG. 2 is a perspective view, taken from a front right side, of a snowmobile having a rear suspension system according to an embodiment of the present invention.

Referring to FIG. 2, the snowmobile 100 has a front end 102 and a rear end 104. The snowmobile 100 has a frame including a tunnel portion 106 and an engine cradle portion 108. An engine 110 (schematically illustrated) is supported by the engine cradle portion 108. A number of fairings 112 are supported on the frame to provide aesthetic appeal. A seat 114 is provided above the tunnel 106 for accommodating a rider and, optionally, one or more passengers.

A pair of skis 116 at the front end 102 of the snowmobile 100 are connected to the frame via a suspension system 118. A steering assembly 120 is provided generally forward of the seat 114, and is connected to the skis 116 in a known manner such that turning the steering assembly 120 turns the skis 116 to steer the snowmobile 100.

At the rear end 104 of the snowmobile 100, an endless track 122 is supported by a rear suspension system 124. The track 122 is partially disposed in the tunnel portion 106 of the frame, and is driven by the engine 110 via a transmission (not shown) to propel the snowmobile 100.

The rear suspension system 124 will now be described with reference to FIGS. 3A, 3B and 3C.

The rear suspension system 124 includes a slide rail assembly 126. The slide rail assembly 126 includes two parallel slide rails 128 (both shown in FIGS. 4A and 4B) that generally position and guide the track 122 (schematically shown in FIG. 3A). The slide rails 128 typically have a curved forward end to follow the track 122 and a flat rear portion to ensure proper traction between the track 122 and the ground. The slide rails 128 typically include a lower sliding surface made of polyethylene to reduce contact friction between the slide rails 128 and the track 122. One or more pairs of lower wheels 130 and one or more pairs of upper wheels 132 engage the track 122 to further guide the track 122. One or more idler wheels 134 are supported on a rail extension assembly 136 to further guide the track 122. The rail extension assembly 136 will be described in further detail below.

The rear suspension system 124 is connected to the tunnel portion 106 via a front suspension arm 138 and a rear suspension arm 140. The front and rear suspension arms 138, 140 are pivotally connected to the tunnel 106 at their upper ends, and pivotally connected to the slide rail assembly 126 at their lower ends. Two shock absorber assemblies 142 bias the slide rail assembly 126 downward against the track 122 to ensure proper contact therebetween. It should be understood that alternative rear suspension systems constructed with a single shock absorber assembly 142 or with more than two shock absorber assemblies 142 are also within the scope of the invention.

Figure 4B:
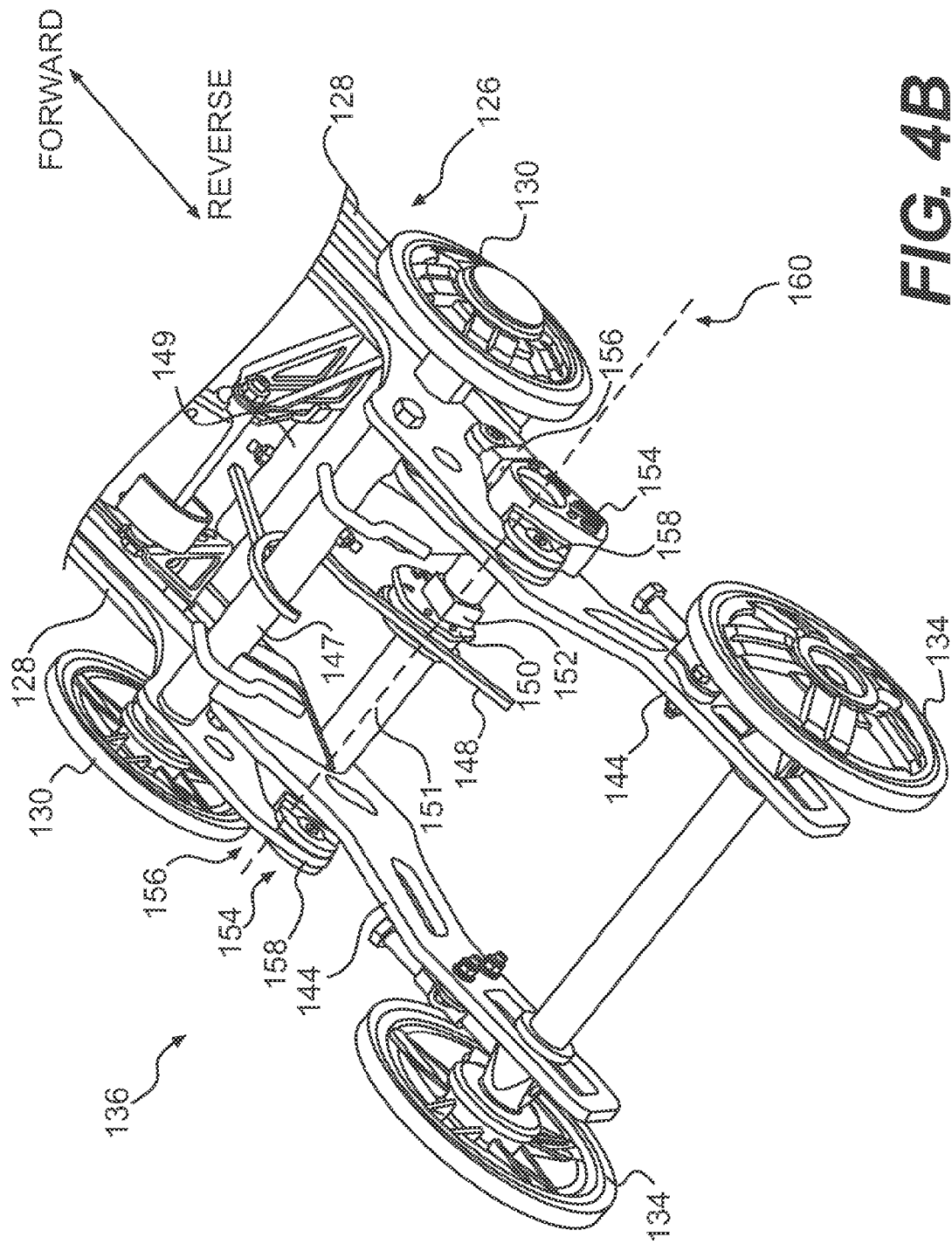
FIGS. 4A and 4B are perspective views of a rear suspension system for a snowmobile according to an embodiment of the present invention, showing different positions of the adjustment cam.
Figure 4A:
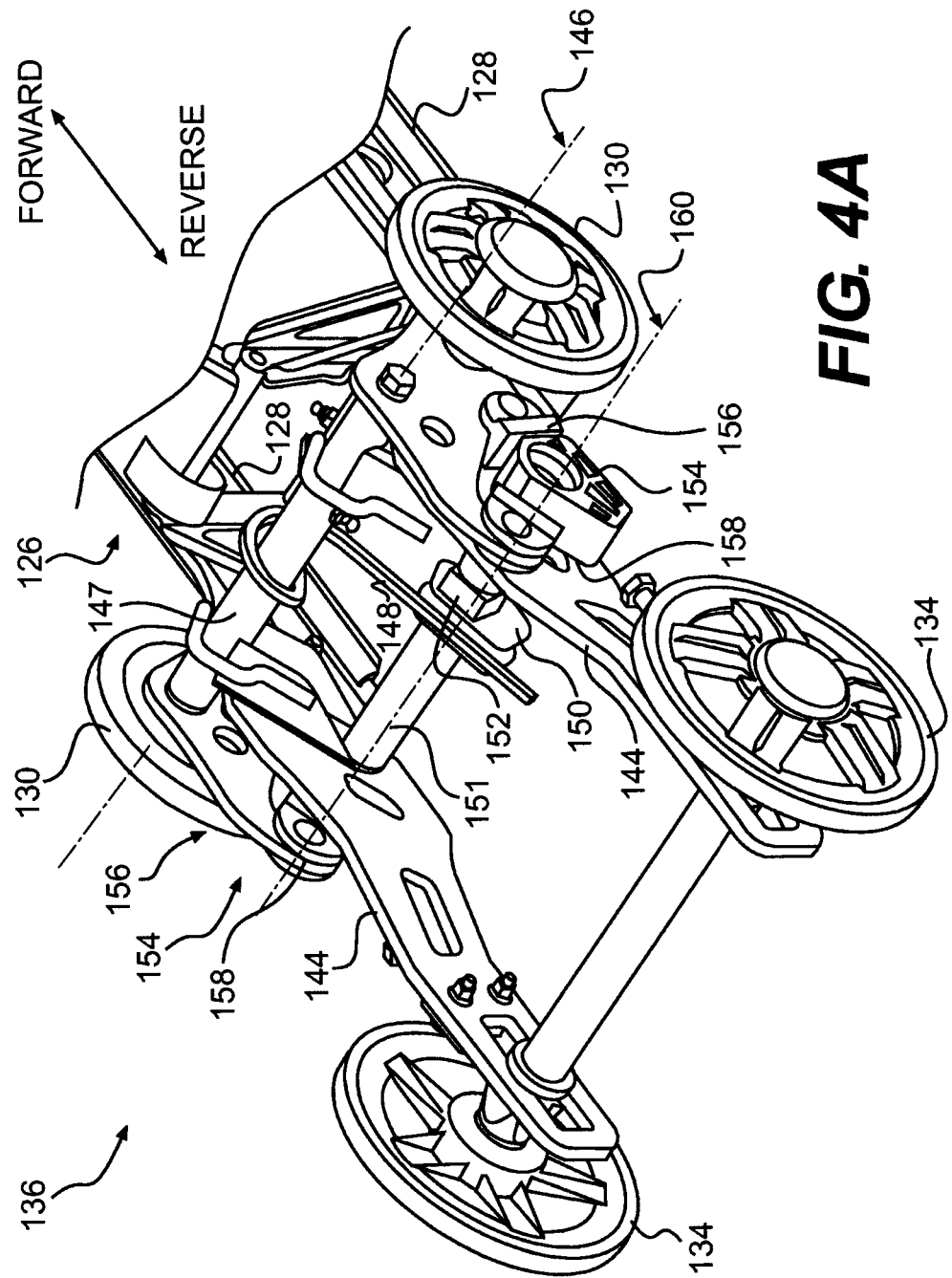
Figure 4B:
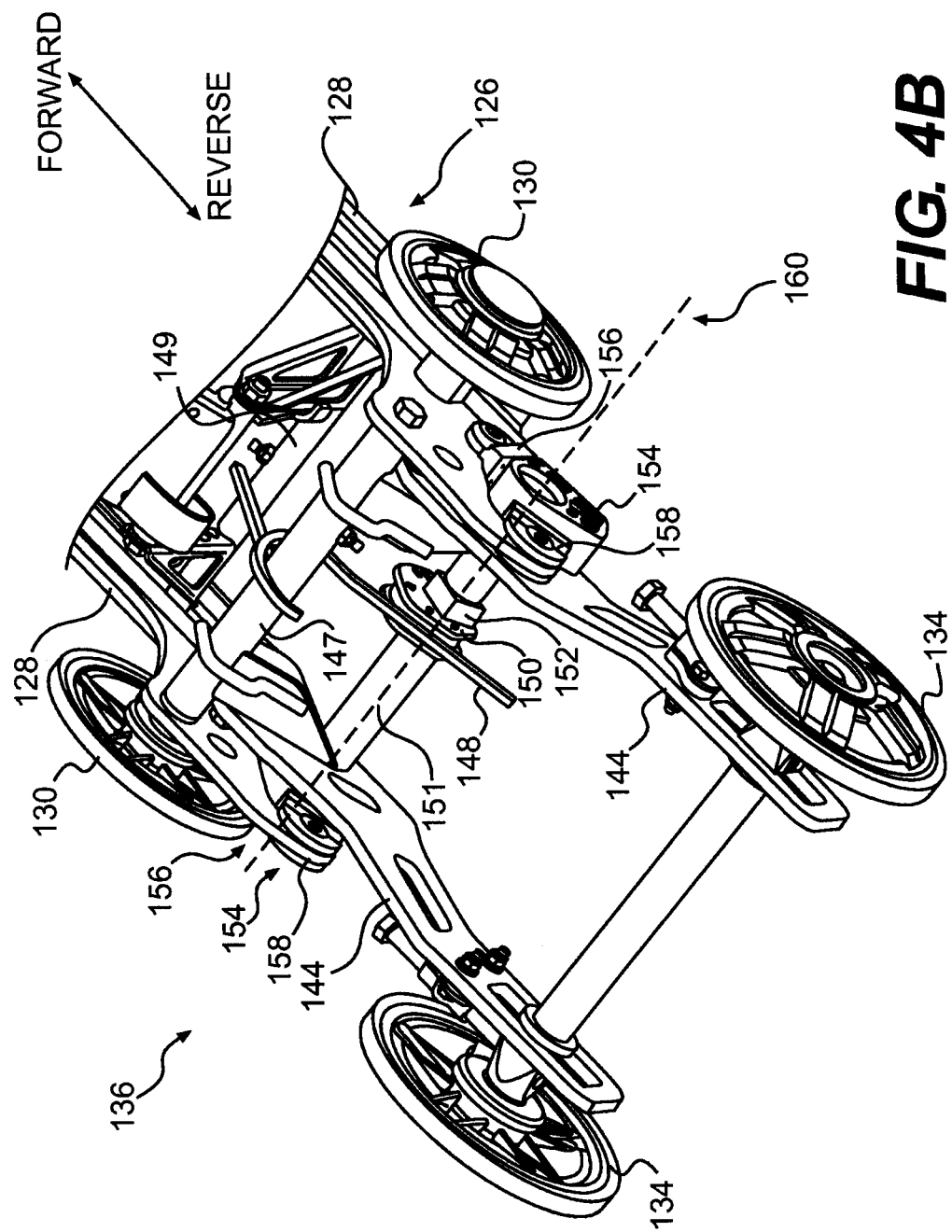
Figure 5A:
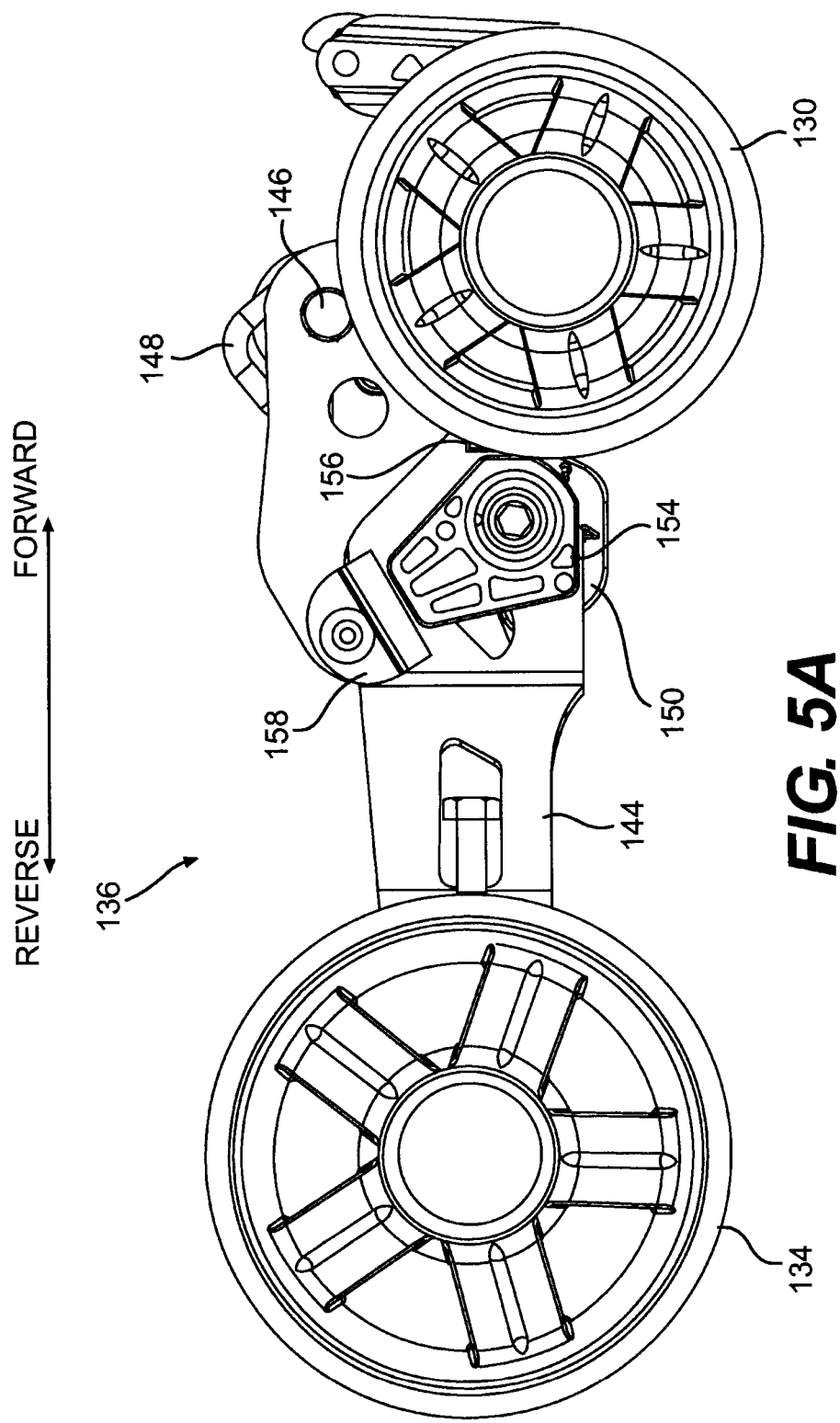
Figure 5B:
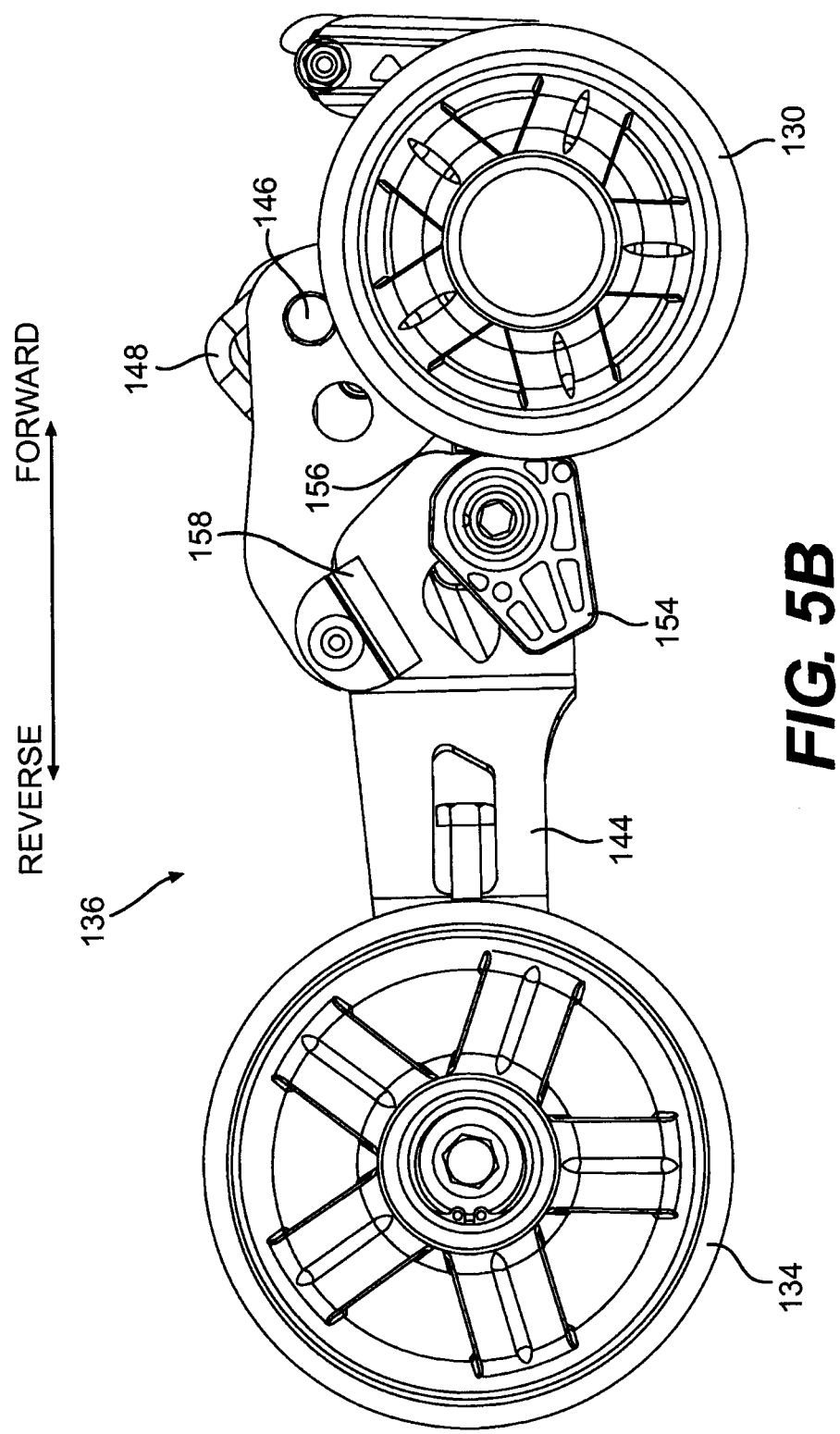
Figure 1:
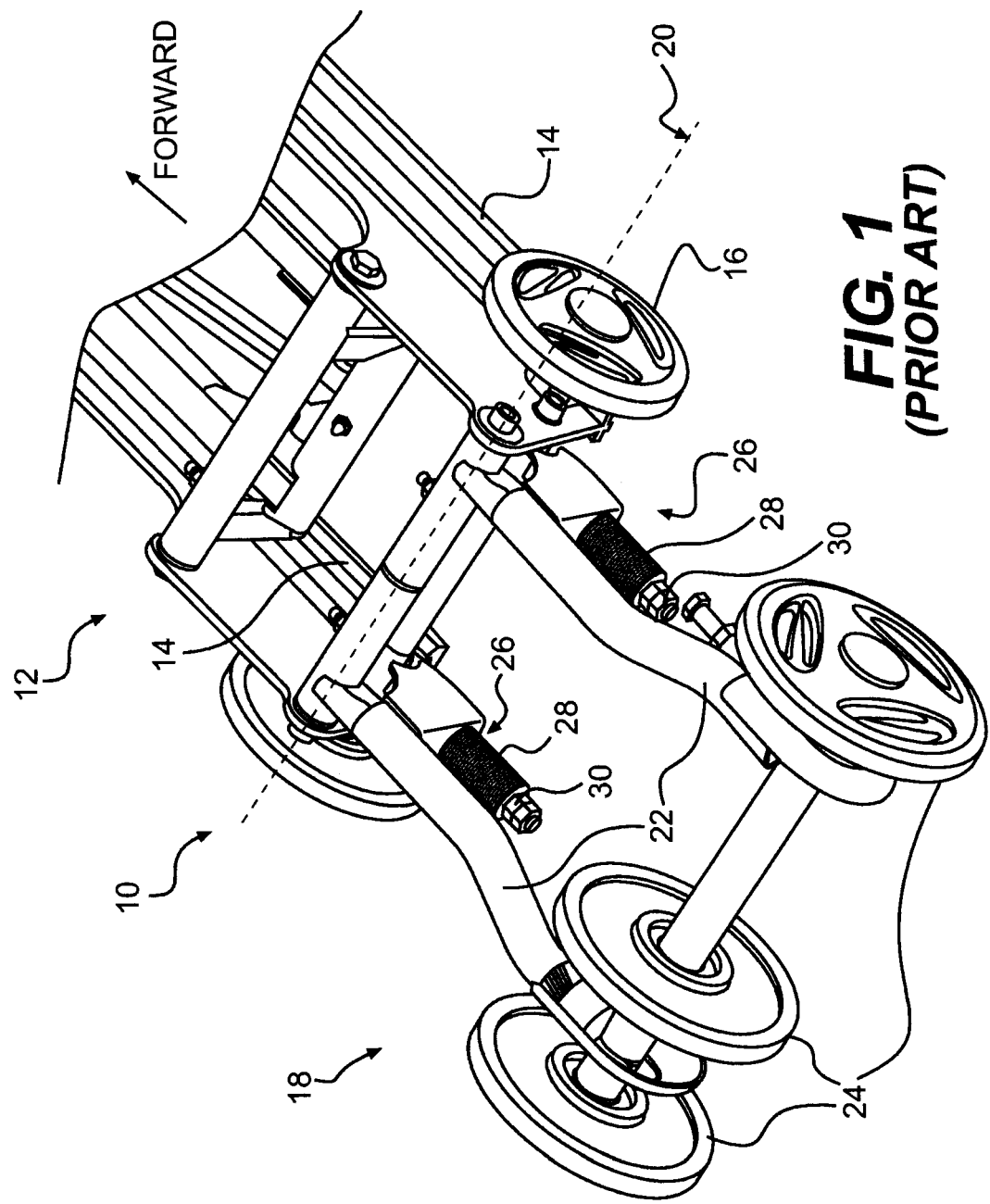
Figure 2:
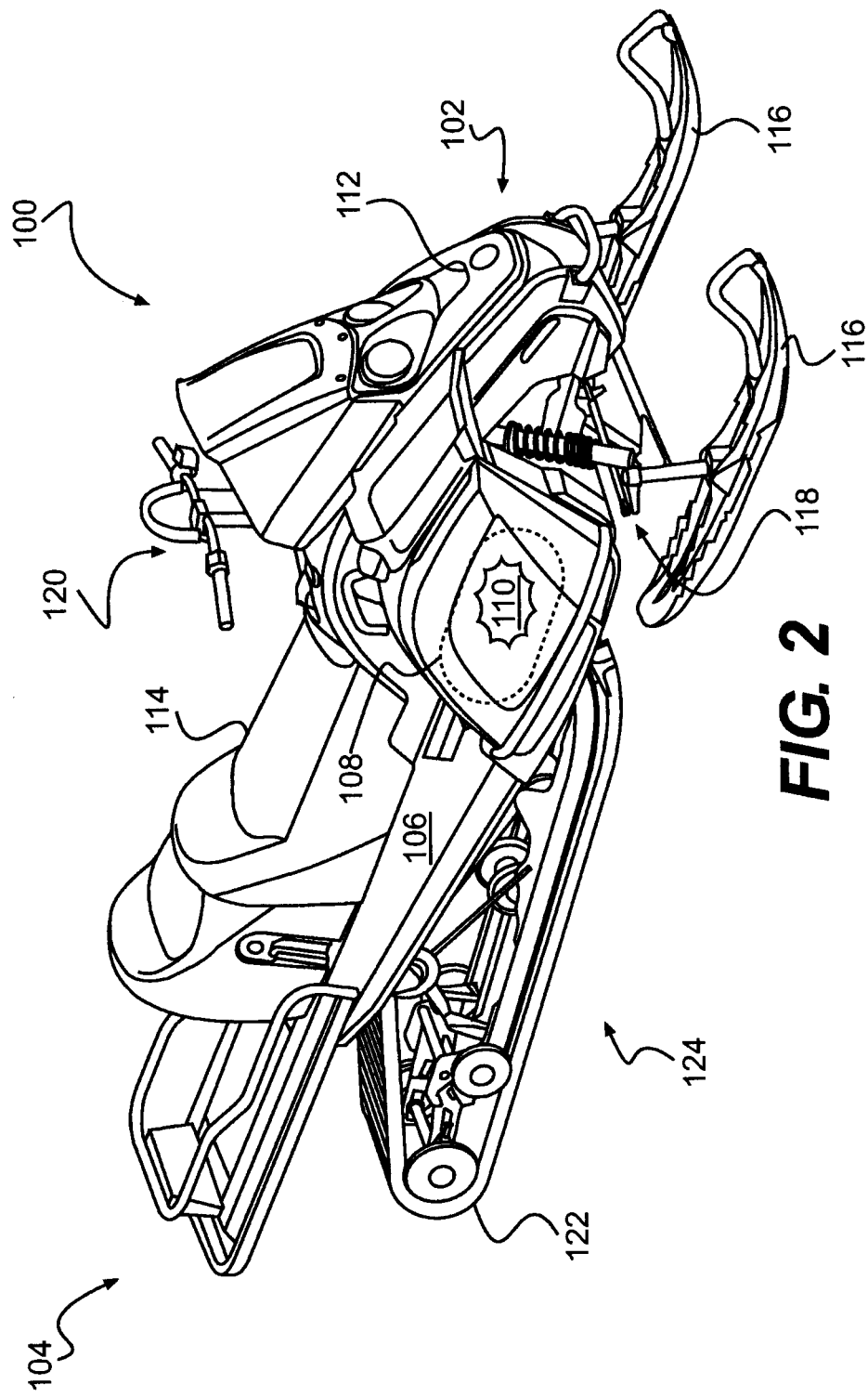
Figure 3A:
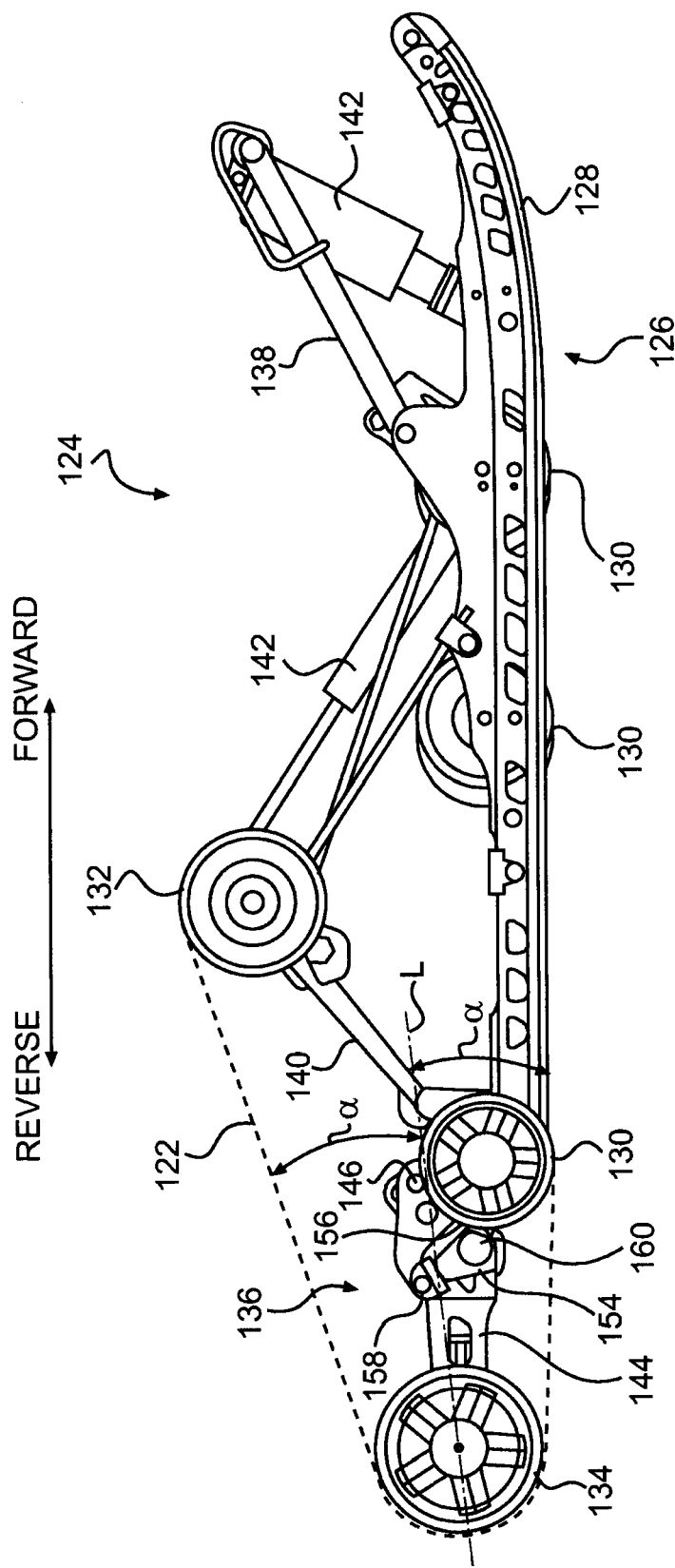
Figure 3B:
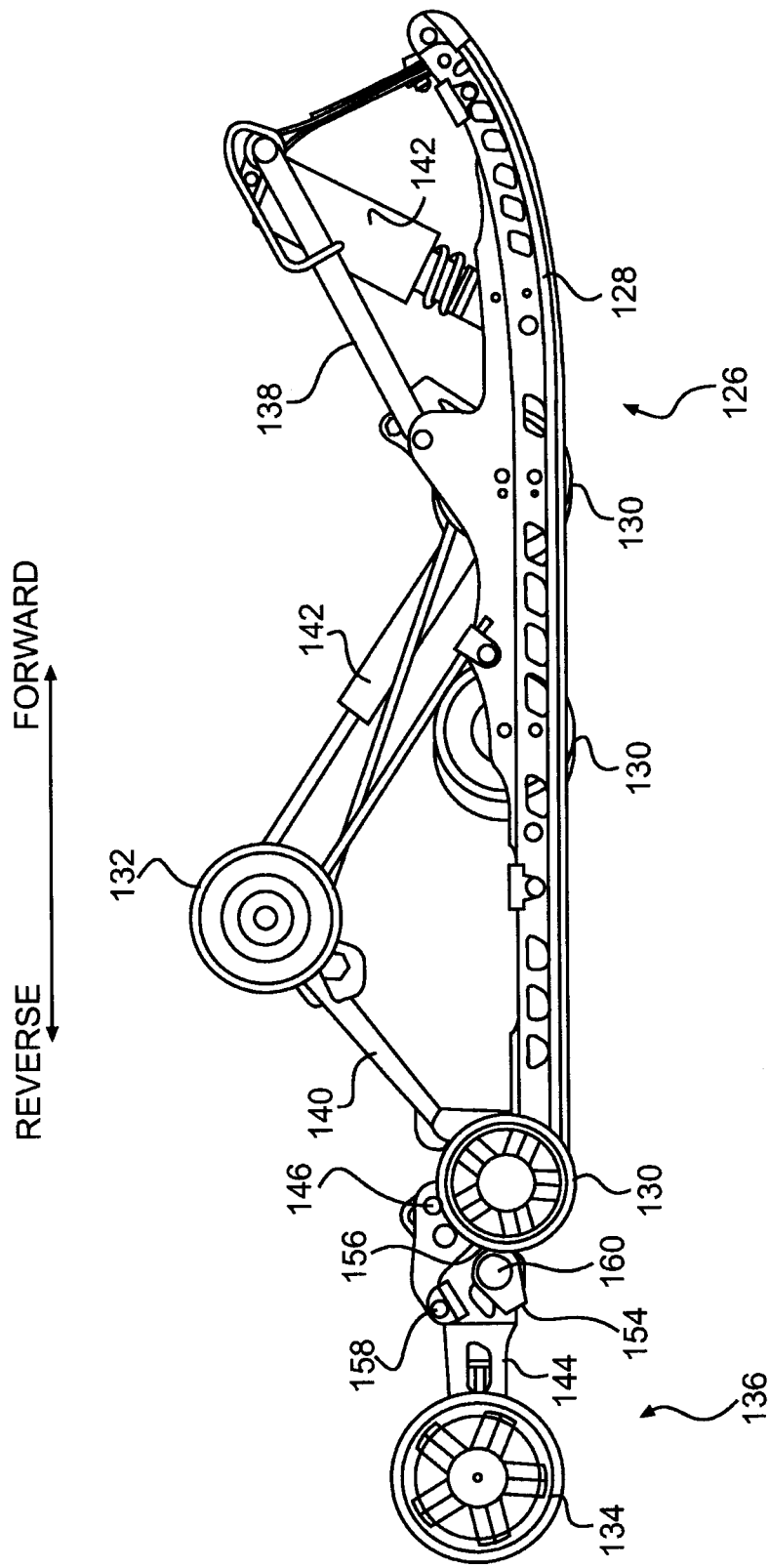
Figure 3C:
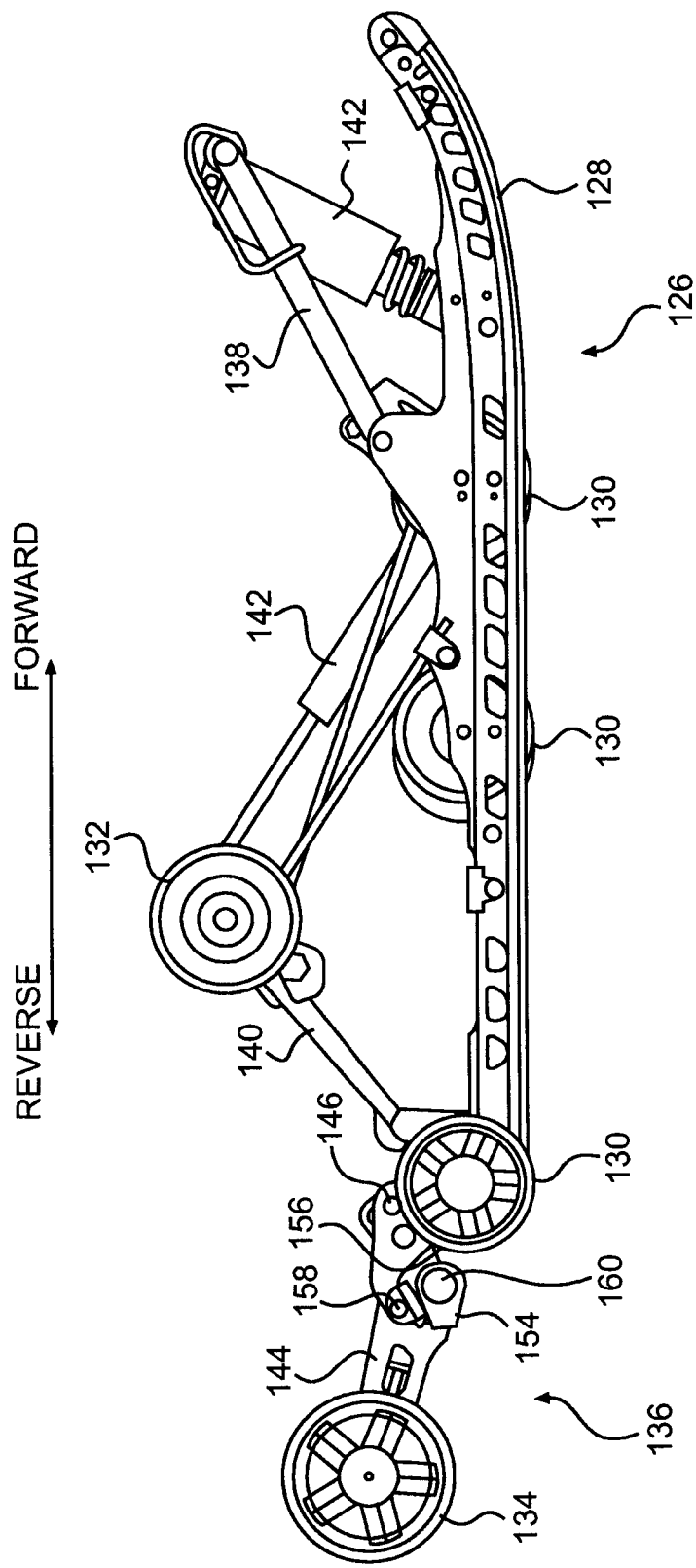
Figure 4A:
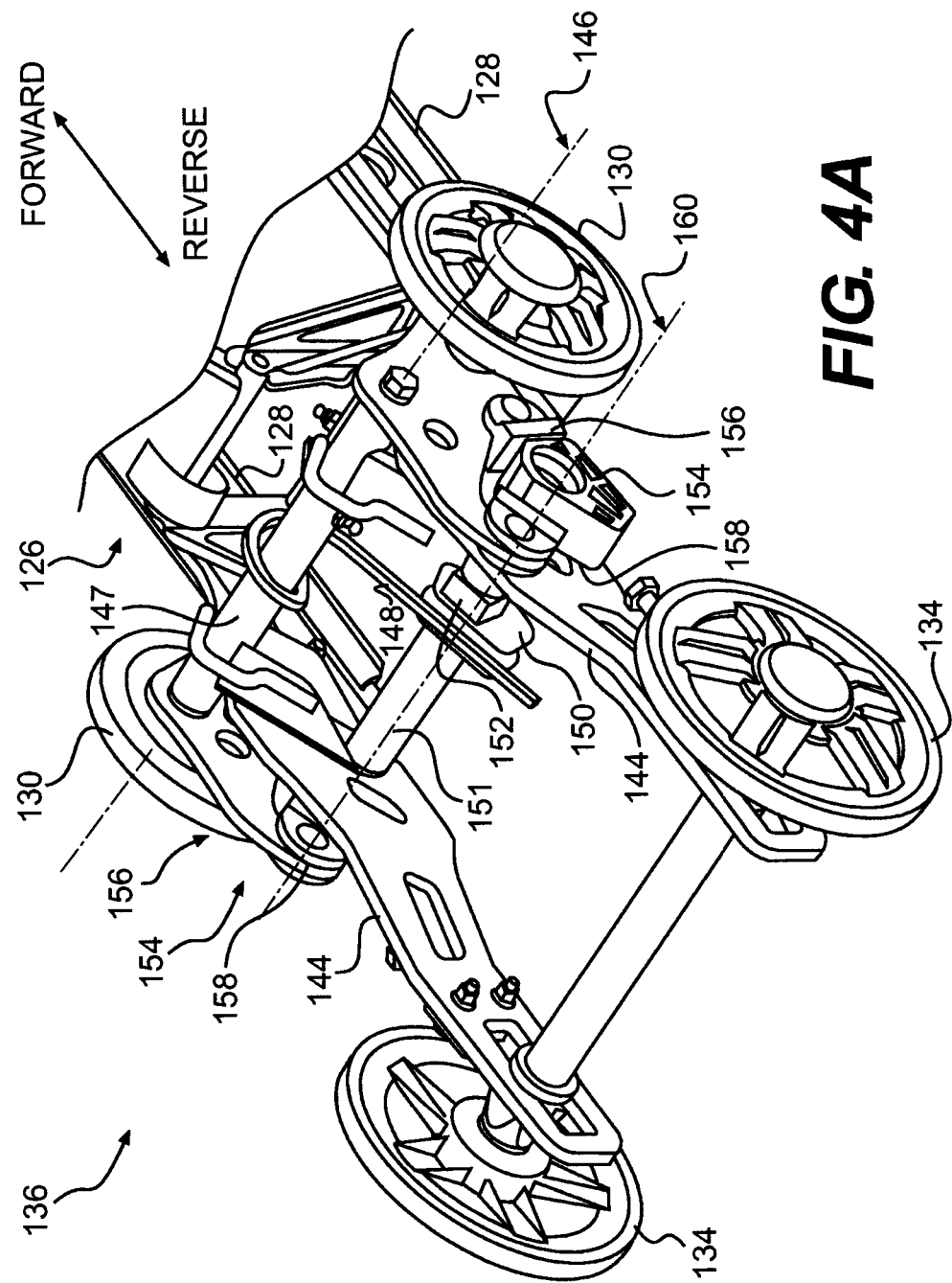
Figure 4B:
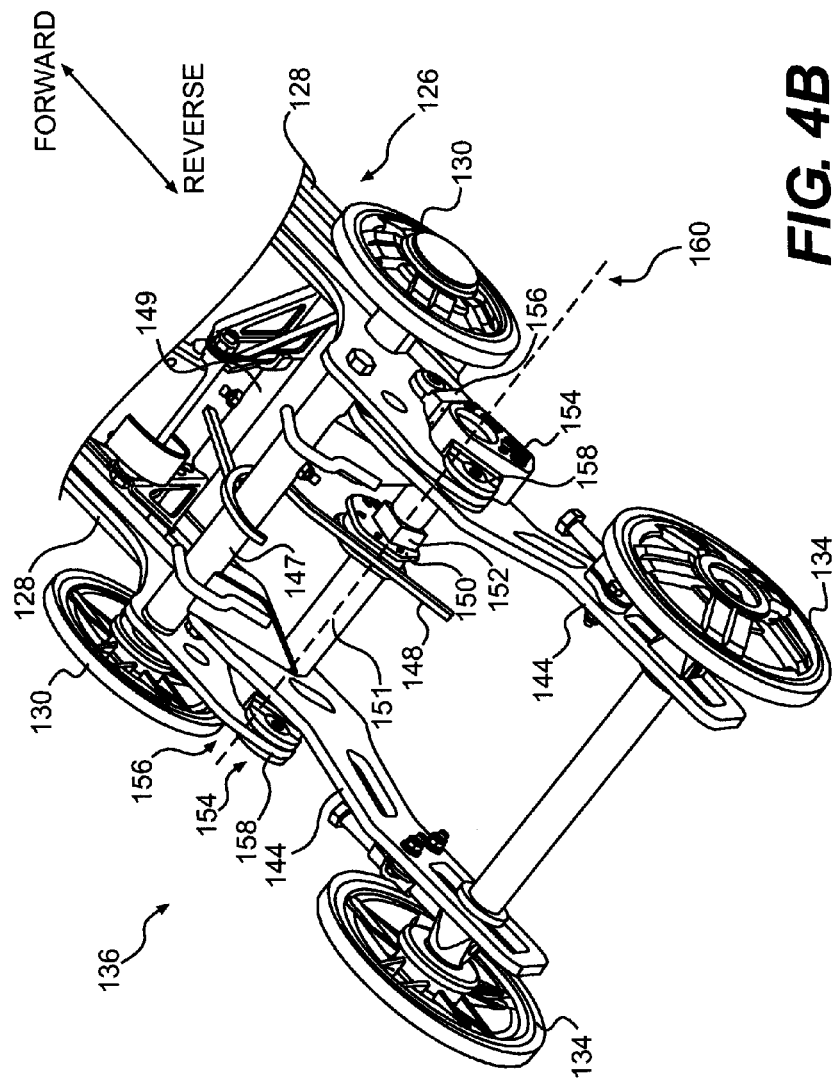
Figure 5A:
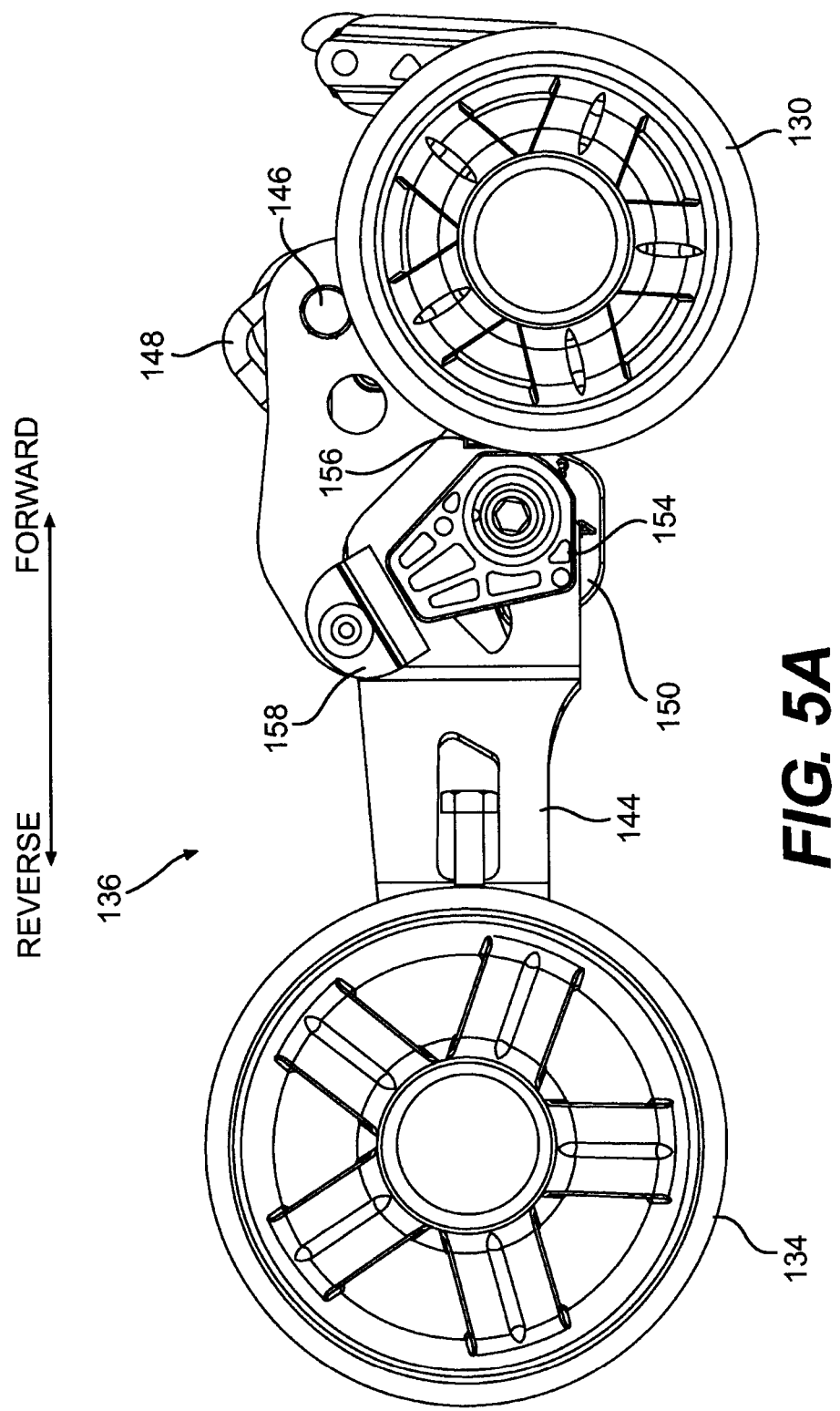
Figure 5B:
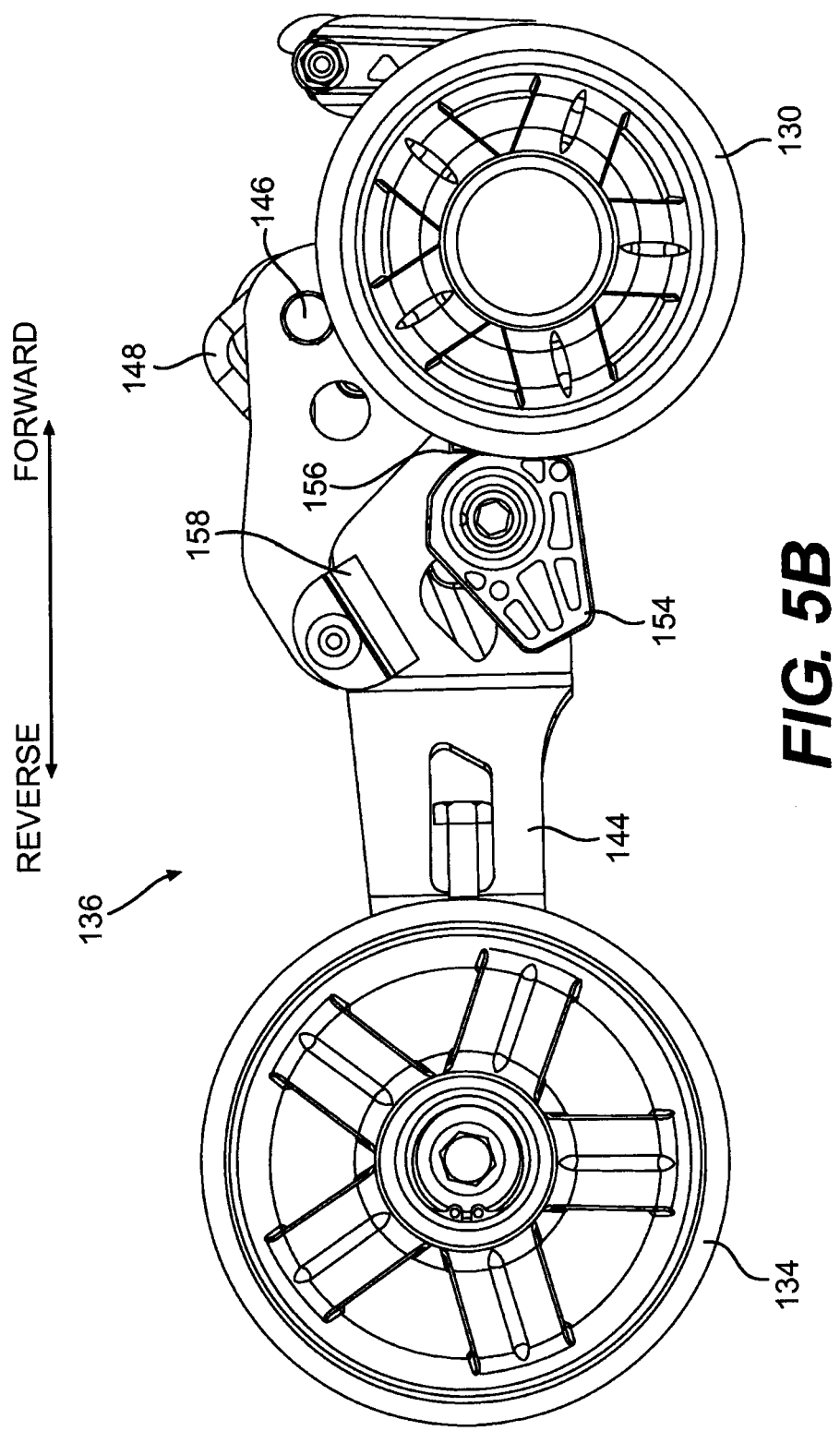

Referring now to FIGS. 4A and 4B, a rail extension assembly 136 according to an embodiment of the present invention will now be described.

The rail extension assembly 136 has two extension arms 144 that support the idler wheels 134. The extension arms 144 are connected to the slide rail assembly 126 such that the rail extension assembly 136 can pivot about the pivot axis 146 defined by the cross member 147 of the rail extension assembly 136. The rail extension assembly 136 can pivot between a lowered position (seen in FIGS. 3A, 3B) and a raised position (seen in FIG. 3C). The line L passes through the center of the idler wheels 134 and bisects the angle between the top and bottom track portions 122 extending forward from the rear idler wheels 134. When the rail extension assembly is in the lowered position, the pivot axis 146 is preferably higher than the line L, to ensure that the forces exerted on the rear idle wheels 134 by the track 122 will tend to force the rear idler wheels 134 towards the ground.

As can be most clearly seen in FIG. 4B, one end of the spring 148 abuts against a cross member 149 of the slide rail assembly 126 and the other end of the spring 148 abuts against the adjustment cam 150 mounted on the cross member 151 of the rail extension assembly 136. The cross member 151 defines an axis of rotation 160 about which the adjustment cam can be pivoted. In this manner, the spring 148 biases the rail extension assembly 136 downward toward the lowered position.

The adjustment cam 150 has an asymmetric shape, such that some portions of the edge of the adjustment cam 150 are closer to the axis of rotation 160, and other portions of the edge of the adjustment cam 150 are farther from the axis of rotation 160. The shape of the cam 150 allows a rider to adjust the magnitude of the biasing force exerted on the rail extension assembly 136 by the spring 148. If the rider desires a stronger biasing force, he can rotate the adjustment cam 150 so that an external surface of the adjustment cam 150 farther from the axis of rotation 160 abuts against the spring 148, as seen in FIG. 4B. In this orientation, the adjustment cam 150 increases the compression of the spring 148, thus increasing the magnitude of the biasing force exerted by the spring 148. Similarly, if the rider desires a weaker biasing force, he can rotate the adjustment cam 150 so that an external surface of the adjustment cam 150 closer to the axis of rotation 160 abuts against the spring 148, as seen in FIG. 4A. In this orientation, the adjustment cam 150 partially reduces the compression of the spring 148, thus decreasing the magnitude of the biasing force exerted by the spring 148.

The adjustment cam 150 is provided with a lateral extension 152 suitable for being gripped by a wrench or similar tool (not shown), to allow the rider to rotate the adjustment cam 150 about the axis 160 to adjust the biasing force of the spring 148. The axis 160 is parallel to the axis 146 in this embodiment.

In the present embodiment, a single spring 148 and a single adjustment cam 150 are used. This arrangement allows simple and convenient adjustment of the biasing force because only a single adjustment cam 150 needs to be rotated. It is contemplated, however, that the invention could be practiced with two or more springs 148, and a corresponding number of adjustment cams 150. In the case of more than one adjustment cam 150, the adjustment cams 150 can be mechanically coupled so that rotating one adjustment cam 150 causes the other adjustment cams 150 to rotate as well, thus necessitating only a single rotation to adjust the biasing force of all of the springs 148.

Figure 3A:
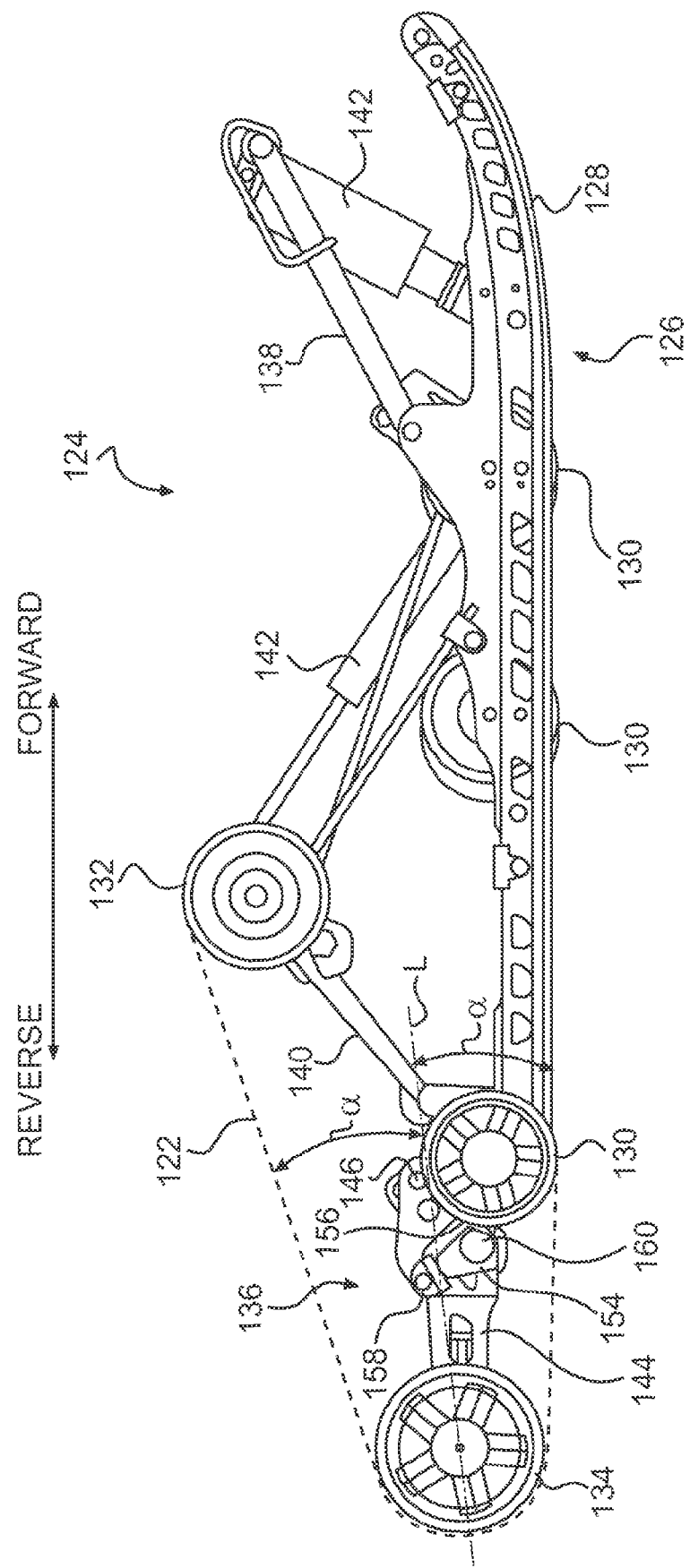
FIGS. 3A to 3C are side elevation views of a rear suspension system for a snowmobile according to an embodiment of the present invention, showing different positions of the rail extension assembly and the blocker cam.

When the snowmobile 100 is operated in the reverse direction indicated in FIG. 3A, the terrain encountered by the portion of the track 122 in the vicinity of the idler wheels 134 exerts an upward force on the idler wheels 134. The idler wheels 134 transmit this force to the extension arms 144, thereby urging the rail extension assembly 136 toward the upward position (seen in FIG. 3C), at least partially overcoming the downward biasing force exerted by the spring 148. It should be understood that softer terrain, such as soft snow, will exert less upward force than harder terrain such as packed snow or dirt. Thus, if the rider anticipates using the snowmobile 100 in the reverse direction on soft snow, he can rotate the adjustment cam 150 so that the spring 148 will exert a comparatively weak biasing force that can be at least partially overcome by the comparatively weak upward force exerted on the track 122 by the soft snow. If the rider anticipates using the snowmobile 100 in the reverse direction on harder terrain, or primarily for towing in the forward direction, he can rotate the adjustment cam 150 so that the spring 148 will exert a comparatively strong biasing force, thereby urging the track 122 against the ground with a greater force to provide improved traction.

Referring again to FIGS. 4A and 4B, a pair of blocker cams 154 are provided on opposite sides of the rail extension assembly 136. The operation of only one blocker cam 154 will be described in detail below, and it should be understood that the other blocker cam 154 operates in substantially the same manner. It is also contemplated that the present invention may be practiced with only a single blocker cam 154, or with more than two blocker cams 154.

A lower stopper 156 and an upper stopper 158 are provided on the slide rail assembly 126 in general alignment with the blocker cam 154. The blocker cam 154 can be rotated about the axis 160 between a blocking position, shown in FIGS. 3A and 5A, and a non-blocking position, shown in FIGS. 3B and 5B. Although in the present embodiment the axes of rotation 160 of the adjustment cam 150 and the blocker cam 154 are coaxial, it should be understood that the two rotate independently, such that the adjustment cam 150 does not rotate when the blocker cam 154 is rotated and vice versa. The adjustment cam 150 and the blocker cam 154 may optionally be arranged such that they rotate about separate axes without departing from the scope of the invention. Thus, the operation of the blocker cam 154 to prevent the rail extension assembly 136 from pivoting to the raised position, which will be described in further detail below, is independent of the magnitude of the biasing force of the spring 148.

In FIGS. 3A, 3B, 5A and 5B, the rail extension assembly 136 is shown in the lowered position. In this position, the blocker cam 154 abuts against the lower stopper 156 to prevent the rail extension assembly 136 from pivoting further downward to a position lower than the slide rails 128, regardless of the position of the blocker cam 154.

Figure 5A:
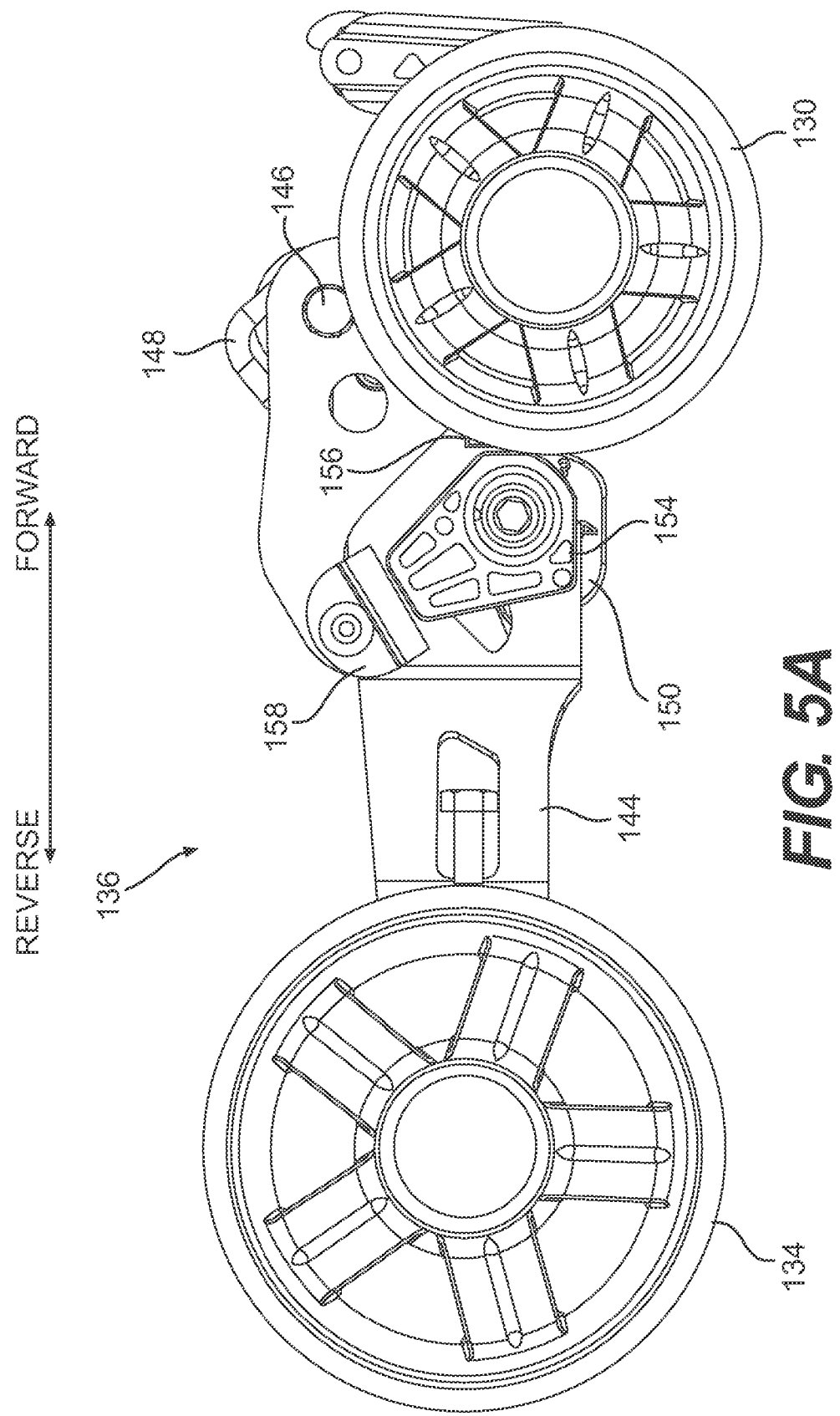
FIGS. 5A and 5B are side elevation views of the rear portion of a rear suspension system for a snowmobile according to an embodiment of the present invention, showing different positions of the blocker cam.

When the rail extension assembly 136 is in the lowered position, the blocker cam 154 can be used to prevent the rail extension assembly 136 from pivoting to the upper position. Referring to FIGS. 3A and 5A, the blocker cam 154 is shown in the blocking position. The blocker cam 154 abuts against the upper stopper 158 to limit upward movement of the rail extension assembly 136 and prevent the rail extension assembly 136 from pivoting to the upper position shown in FIG. 3C even when an upward force is exerted on the rail extension assembly 136 by the terrain. This provides increased traction when desired by the rider.

Figure 3B:
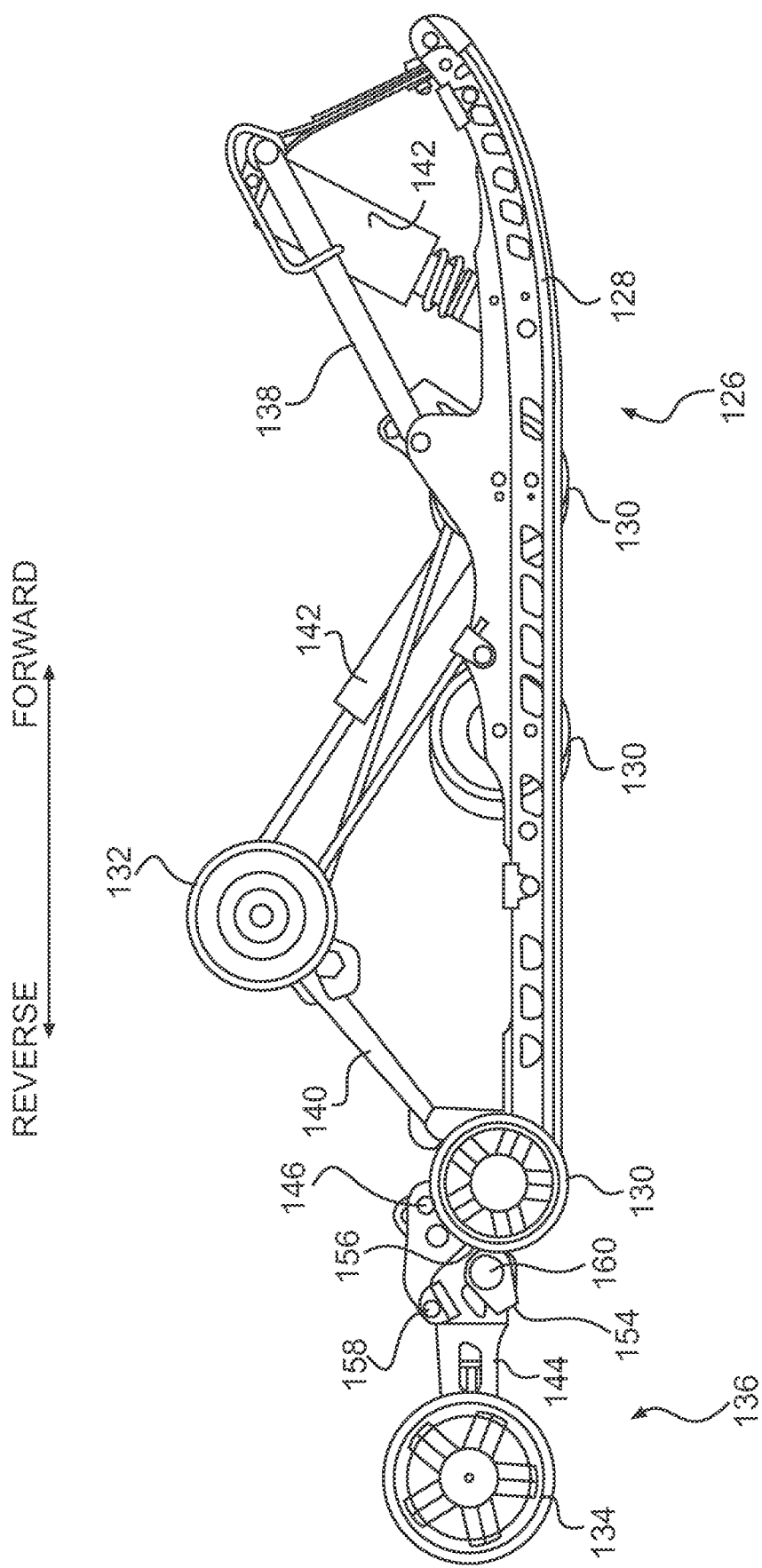
Figure 3C:
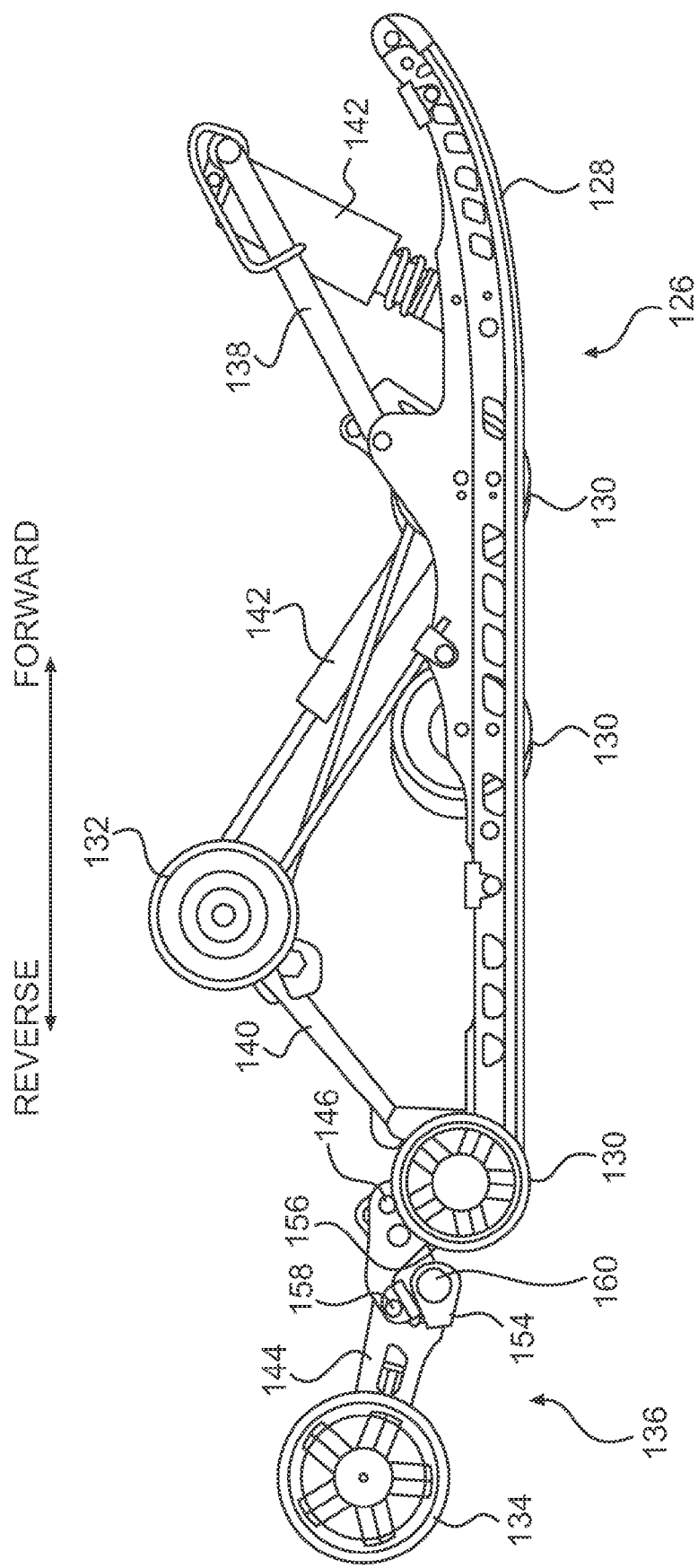
Figure 5B:
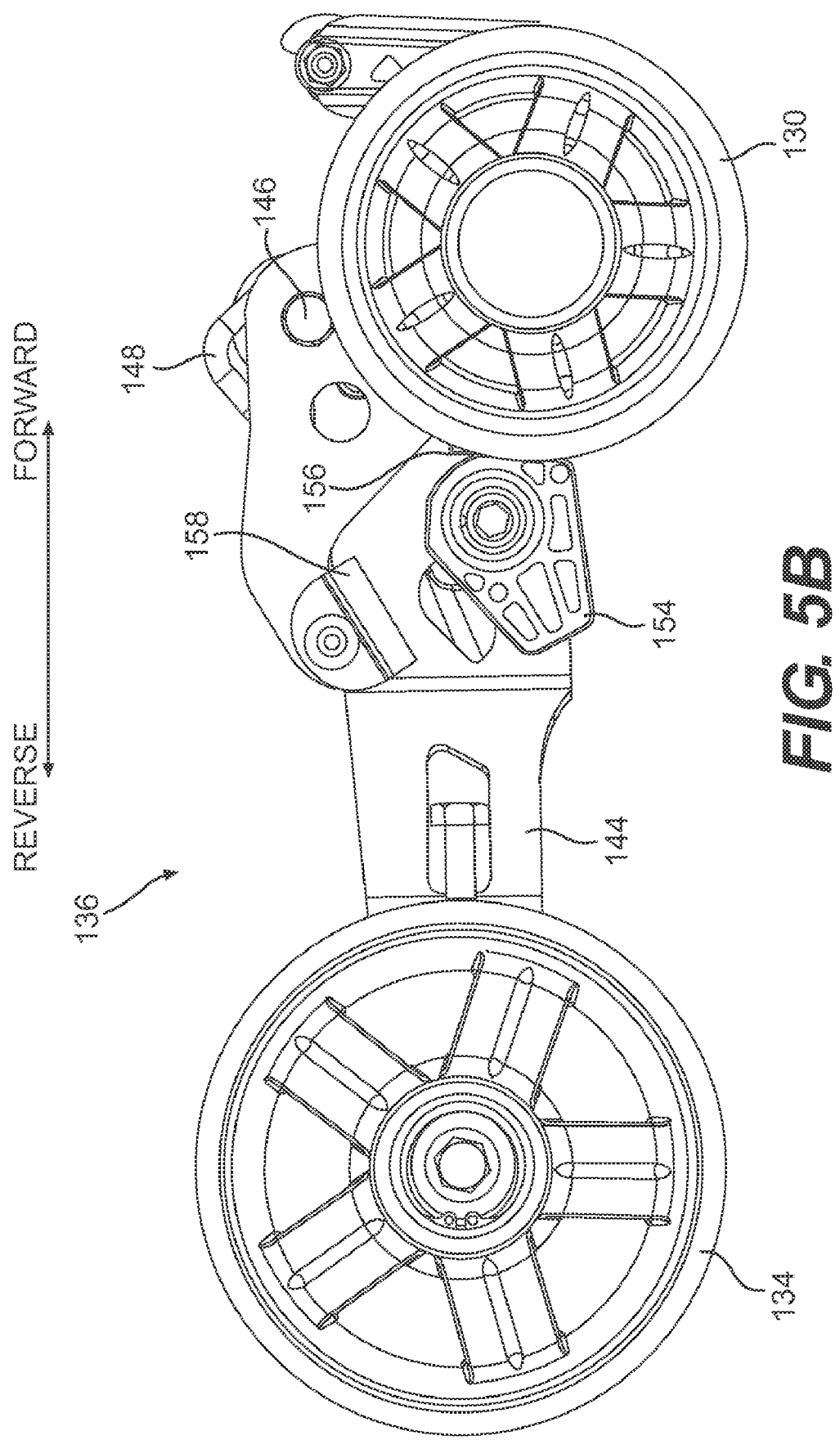
Figure 1:
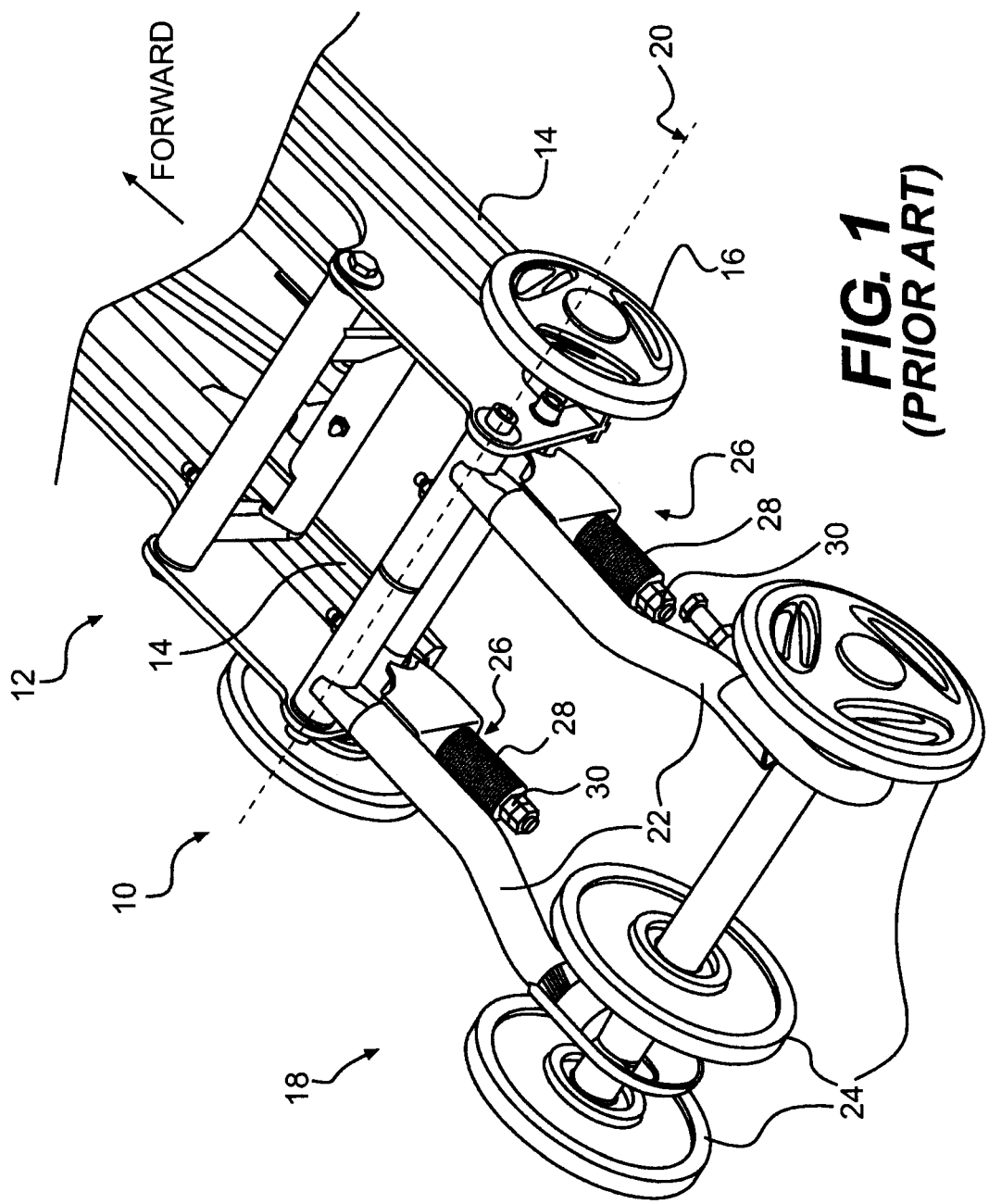
Figure 2:
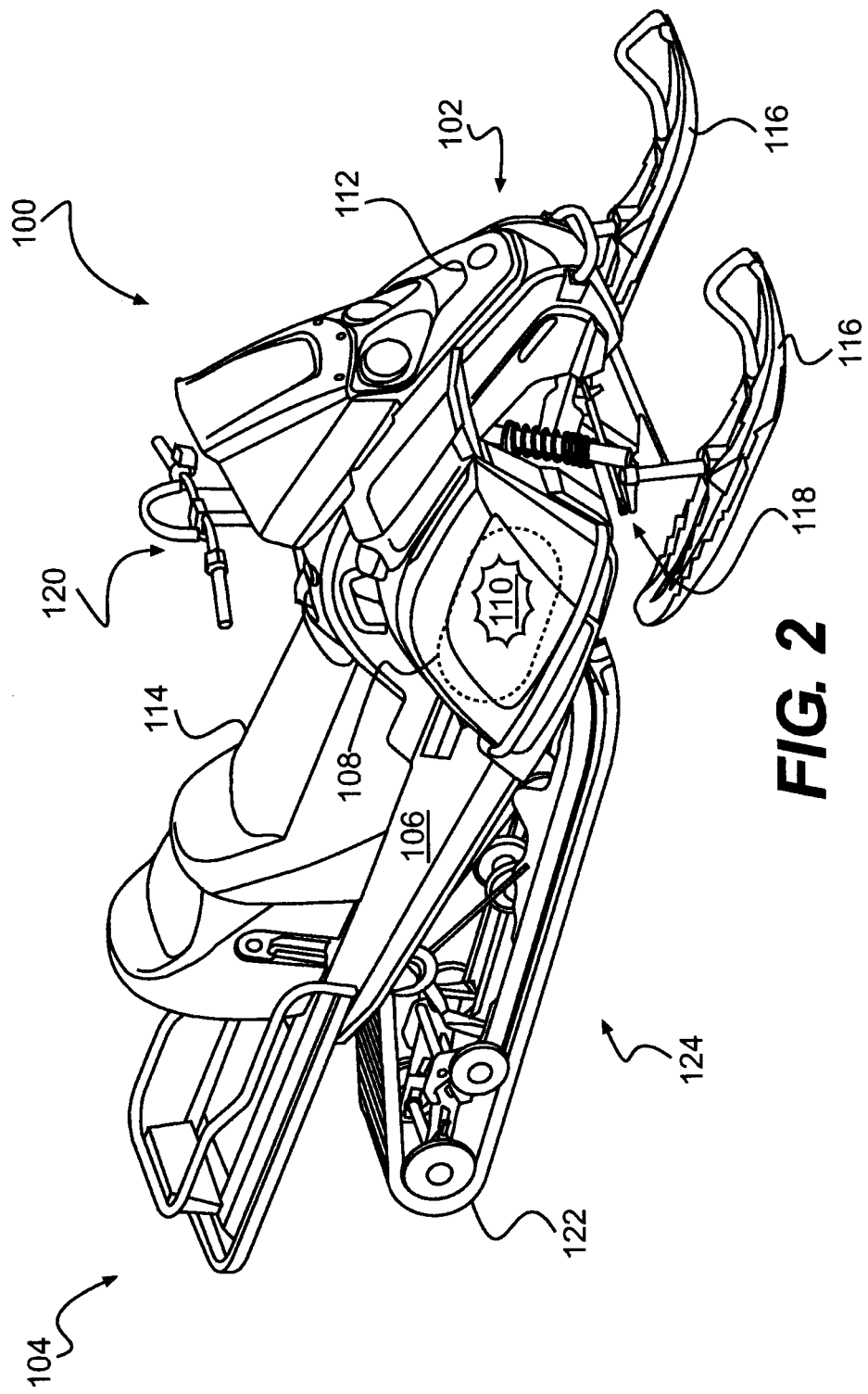
Figure 3A:
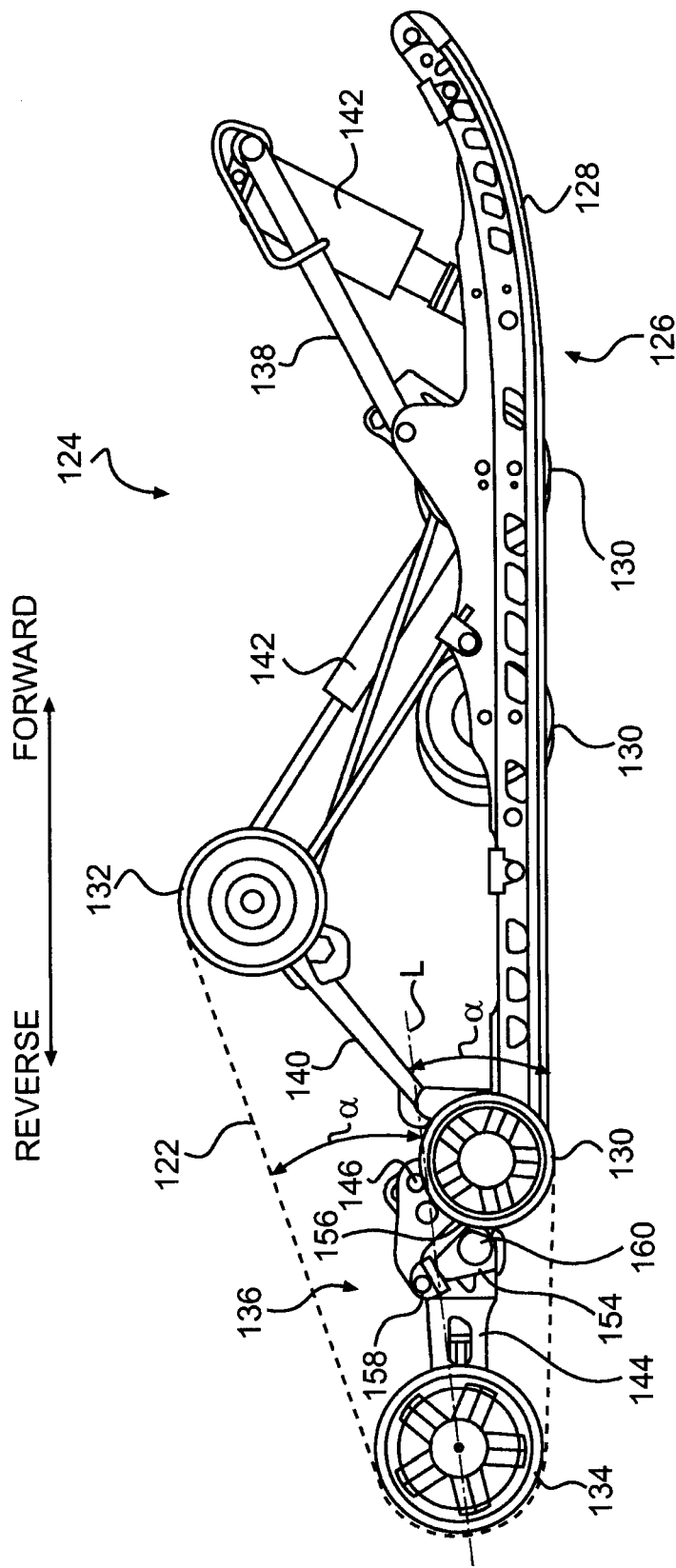
Figure 3B:
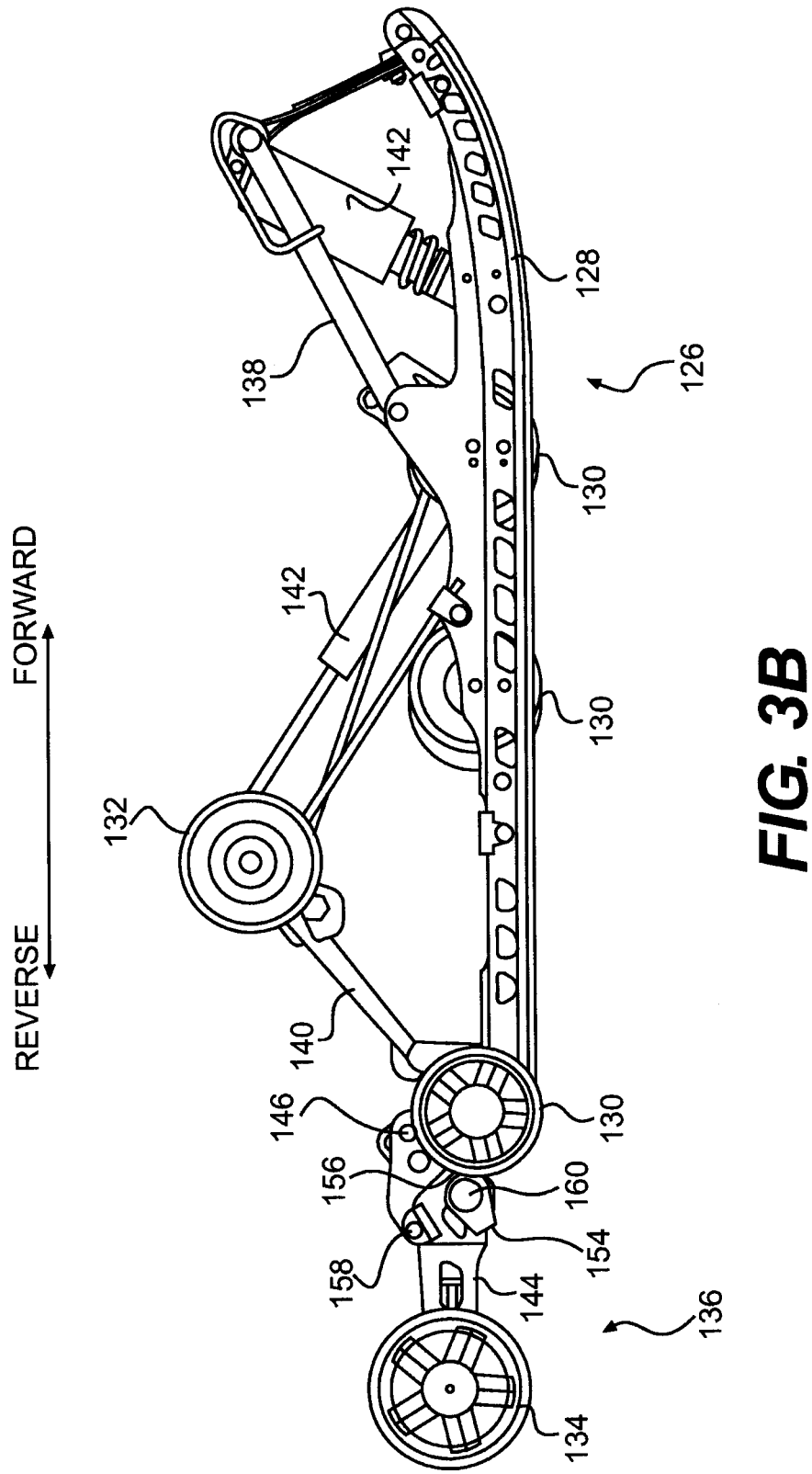
Figure 3C:
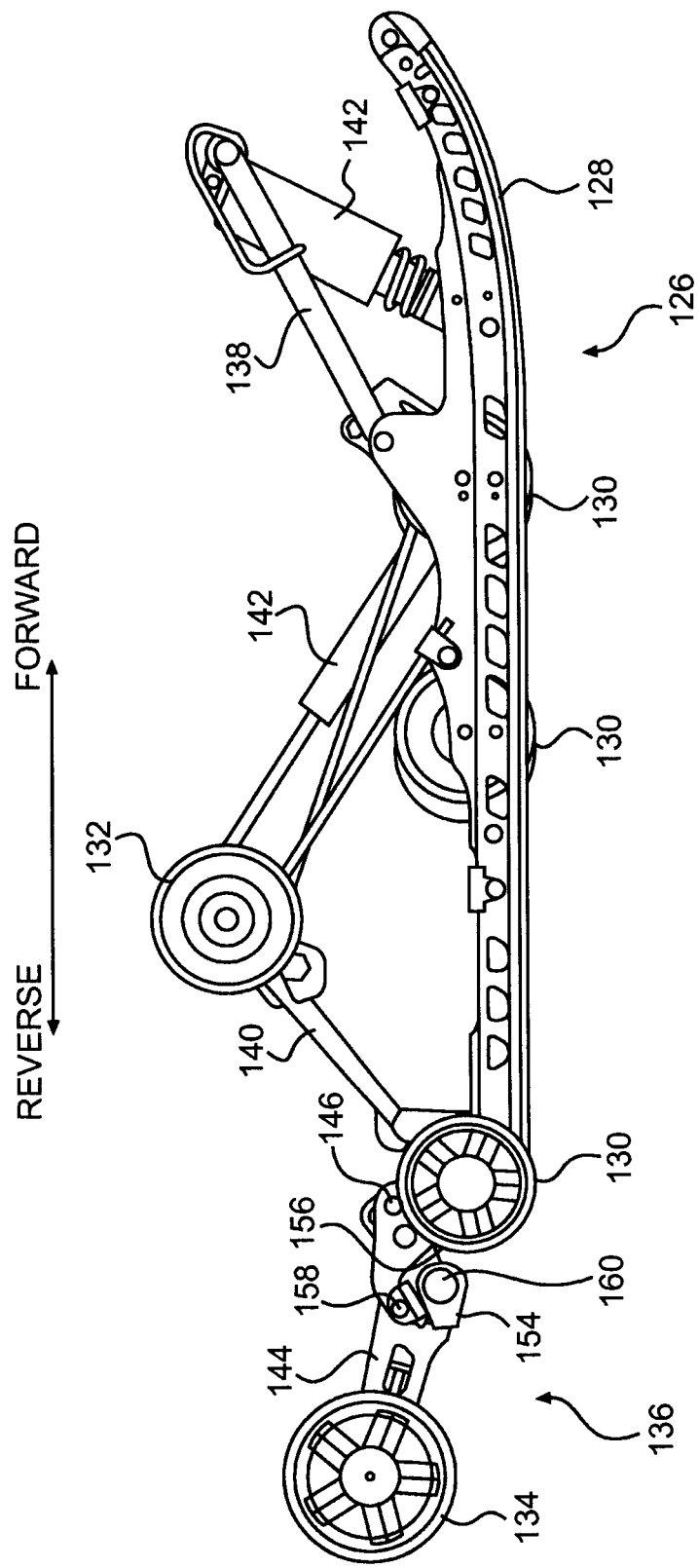

Referring to FIGS. 3B and 5B, when the blocker cam 154 is in the non-blocking position, the blocker cam 154 is spaced away from the upper stopper 158. In this configuration, the rail extension assembly 136 is able to pivot to the raised position shown in FIG. 3C, when an upward force on the rail extension assembly 136 is strong enough to overcome the downward biasing force of the spring 148. In the raised position, the blocker cam 154 abuts against the upper stopper 158 to limit further upward movement of the rail extension assembly 136. When the rail extension assembly 136 is in the upward position, the angle of the track 122 provides a ramp such that the track 122 will maintain or pull the snowmobile 100 on top of snow and other obstacles, and prevent the snowmobile 100 from becoming stuck.

The lower stoppers 156 and the upper stoppers 158 are preferably coated with a resilient material, such as rubber, to cushion the impacts of the blocker cam 154 thereon while the snowmobile 100 is in operation.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

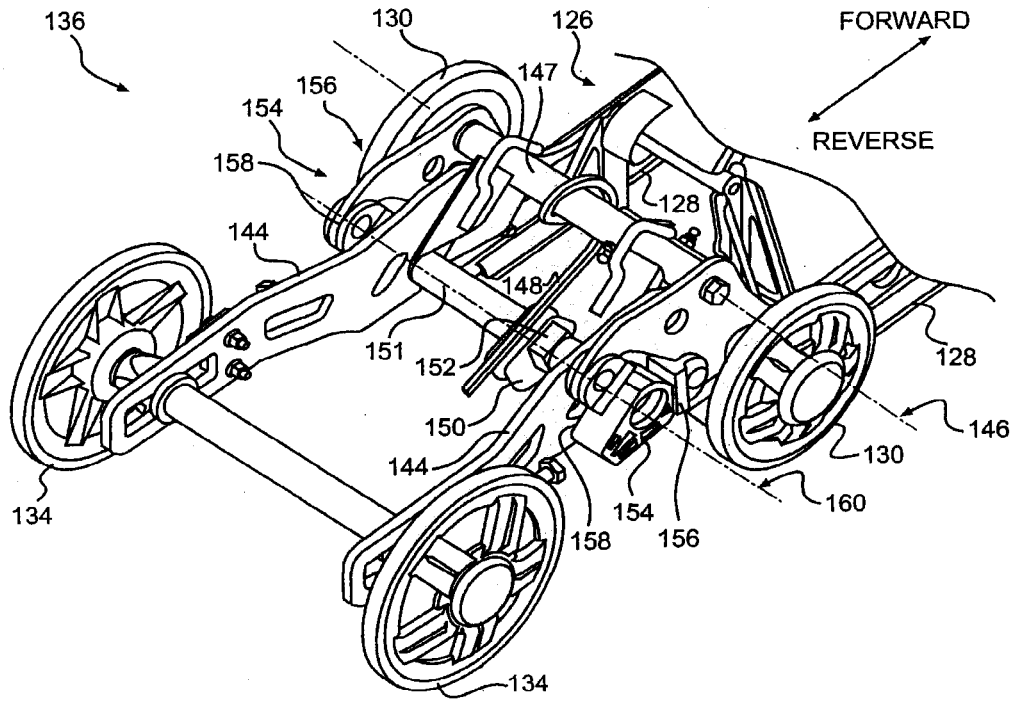

What is claimed is:

1. A suspension assembly for a vehicle having a chassis and an endless drive track, the suspension assembly comprising:
   a suspension arm having a first end and a second end, the first end of the suspension arm being pivotally connectable to the chassis;
   a slide frame assembly pivotally connected to the second end of the suspension arm;
   at least one shock absorber assembly pivotally connected to the slide frame assembly, the at least one shock absorber assembly biasing the slide frame assembly away from the chassis;
   a rail extension assembly comprising at least one extension arm, the at least one extension arm having a front end, the front end of the at least one extension arm being pivotably connected to a rear portion of the slide frame assembly about a first axis, the rail extension assembly being pivotable between a raised position and a lowered position with respect to the slide frame assembly about the first axis;
   at least one rear idler wheel rotatably connected to a rear portion of the rail extension assembly for guiding the endless drive track;
   at least one spring biasing the rail extension assembly toward the lowered position by exerting thereon a biasing force;
   a movable member movable between a first position and a second position to adjust the magnitude of the biasing force;
   at least one blocking cam mounted to one of the slide frame assembly and the rail extension assembly, the at least one blocking cam being movable between a first position and a second position to prevent the rail extension assembly from pivoting from the lowered position to the raised position independently of a magnitude of the biasing force; and
   at least one stopper mounted to the other of the slide frame assembly and the rail extension assembly;
   wherein when the rail extension assembly is in the lowered position, the at least one blocking cam is movable between:
      the first position, where the at least one blocking cam prevents the rail extension assembly from pivoting to the raised position; and
      the second position, where the at least one blocking cam does not prevent the rail extension assembly from pivoting to the raised position;
   wherein when the at least one blocking cam is in the second position and the rail extension assembly is in the raised position, the at least one blocking cam abuts against the at least one stopper.

2. The suspension assembly of claim 1, wherein the at least one blocking cam is mounted to the rail extension assembly and the at least one stopper is mounted to the slide frame assembly.

3. The suspension assembly of claim 2, wherein the at least one stopper is at least one upper stopper;
    the suspension assembly further comprising at least one lower stopper mounted to the slide frame assembly,
    such that when the rail extension assembly is in the lowered position the at least one blocking cam abuts against the at least one lower stopper.

4. The suspension assembly of claim 1, wherein the at least one blocking cam comprises two laterally spaced blocking cams and the at least one stopper comprises two laterally spaced stoppers corresponding to the two laterally spaced blocking cams.

5. The suspension assembly of claim 4, wherein the stoppers are made at least in part from an elastomeric material.

6. The suspension assembly of claim 1, incorporated in a snowmobile.

* * * * *

UNITED STATES PATENT AND TRADEMARK OFFICE
CERTIFICATE OF CORRECTION

| | | |
|---|---|---|
| PATENT NO. | : 7,802,645 B2 | Page 1 of 11 |
| APPLICATION NO. | : 11/844603 | |
| DATED | : September 28, 2010 | |
| INVENTOR(S) | : Bertrand Mallette et al. | |

It is certified that error appears in the above-identified patent and that said Letters Patent is hereby corrected as shown below:

Delete the Title Page showing an illustrative figure, and substitute the attached title page therefor.

Delete figures 1 thru 5A, and substitute the attached drawings therefor.

Signed and Sealed this
Twelfth Day of April, 2011

David J. Kappos
*Director of the United States Patent and Trademark Office*

(12) United States Patent
Mallette et al.

(10) Patent No.: US 7,802,645 B2
(45) Date of Patent: Sep. 28, 2010

(54) ARTICULATED SUSPENSION ASSEMBLY FOR A TRACKED VEHICLE

(75) Inventors: Bertrand Mallette, Rock-Forest (CA); Pascal Gagnon, Valcourt (CA); Mario Cote, Racine (CA)

(73) Assignee: Bombardier Recreational Products Inc., Valcourt (CA)

( * ) Notice: Subject to any disclaimer, the term of this patent is extended or adjusted under 35 U.S.C. 154(b) by 339 days.

(21) Appl. No.: 11/844,603

(22) Filed: Aug. 24, 2007

(65) Prior Publication Data
US 2009/0050390 A1    Feb. 26, 2009

(51) Int. Cl.
*B62M 27/02*    (2006.01)
(52) U.S. Cl. .................... 180/190; 180/9.52
(58) Field of Classification Search .......... 180/186, 180/190, 191, 193, 9.5–9.64
See application file for complete search history.

(56) References Cited

U.S. PATENT DOCUMENTS

| | | | |
|---|---|---|---|
| 3,692,132 A * | 9/1972 | Pollanen | 180/193 |
| 4,987,965 A * | 1/1991 | Bourret | 180/193 |
| 6,206,124 B1 * | 3/2001 | Mallette et al. | 180/193 |
| 6,889,987 B2 * | 5/2005 | Ouellette | 280/9 |
| 2005/0016784 A1 * | 1/2005 | Fecteau | 180/182 |

* cited by examiner

*Primary Examiner*—Kevin Hurley
(74) *Attorney, Agent, or Firm*—Osler, Hoskin & Harcourt LLP

(57) ABSTRACT

A suspension assembly for a vehicle having an endless drive track is disclosed. The suspension assembly has a slide frame assembly and a rail extension assembly pivotably connected to a rear portion of the slide frame assembly and pivots about a first axis. The rail extension assembly is pivotable between a raised position and a lowered position with respect to the slide frame assembly. A spring biases the rail extension assembly toward the lowered position. The magnitude of the biasing force of the spring is adjustable. The rail extension assembly can be prevented from pivoting from the lowered position to the raised position independently of the magnitude of the biasing force.

6 Claims, 9 Drawing Sheets

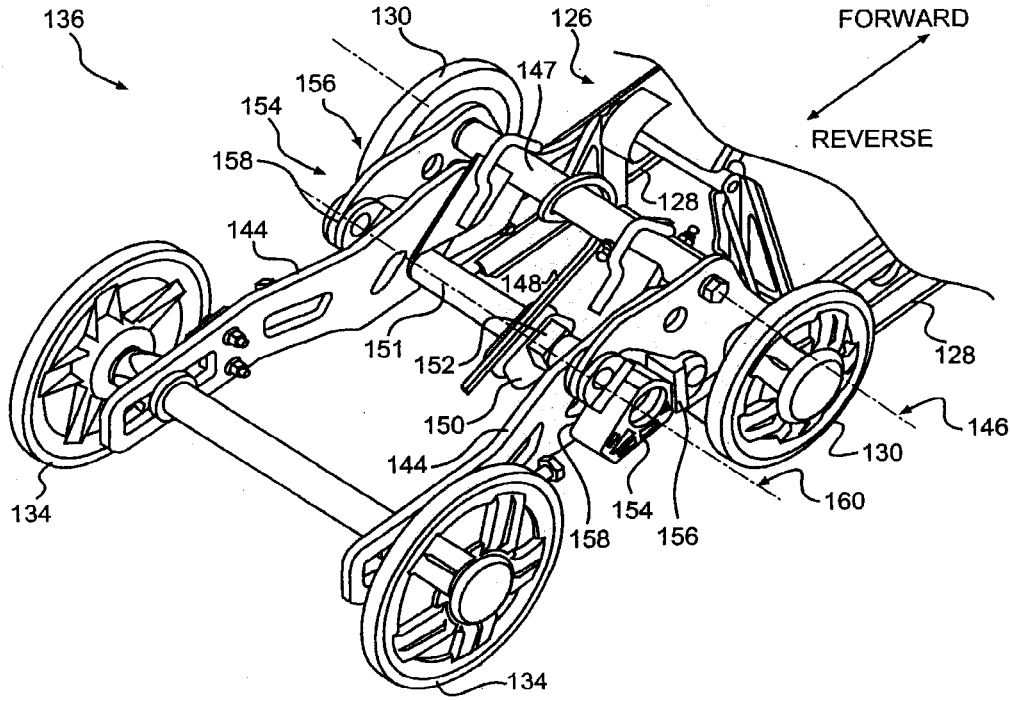

UNITED STATES PATENT AND TRADEMARK OFFICE
CERTIFICATE OF CORRECTION

PATENT NO. : 7,802,645 B2
APPLICATION NO. : 11/844603
DATED : September 28, 2010
INVENTOR(S) : Bertrand Mallette et al.

It is certified that error appears in the above-identified patent and that said Letters Patent is hereby corrected as shown below:

Delete the Title Page showing an illustrative figure, and substitute the attached title page therefor.

Delete figures 1 thru 5B, and substitute the attached drawings therefor.

This certificate supersedes the Certificate of Correction issued April 12, 2011.

Signed and Sealed this
Thirty-first Day of May, 2011

David J. Kappos
*Director of the United States Patent and Trademark Office*

(12) United States Patent
Mallette et al.

(10) Patent No.: US 7,802,645 B2
(45) Date of Patent: Sep. 28, 2010

(54) ARTICULATED SUSPENSION ASSEMBLY FOR A TRACKED VEHICLE

(75) Inventors: Bertrand Mallette, Rock-Forest (CA); Pascal Gagnon, Valcourt (CA); Mario Cote, Racine (CA)

(73) Assignee: Bombardier Recreational Products Inc., Valcourt (CA)

( * ) Notice: Subject to any disclaimer, the term of this patent is extended or adjusted under 35 U.S.C. 154(b) by 339 days.

(21) Appl. No.: 11/844,603

(22) Filed: Aug. 24, 2007

(65) Prior Publication Data
US 2009/0050390 A1  Feb. 26, 2009

(51) Int. Cl.
*B62M 27/02* (2006.01)
(52) U.S. Cl. ............................ 180/190; 180/9.52
(58) Field of Classification Search .......... 180/186, 180/190, 191, 193, 9.5–9.64
See application file for complete search history.

(56) References Cited

U.S. PATENT DOCUMENTS

| | | | |
|---|---|---|---|
| 3,692,132 A * | 9/1972 | Pollanen | 180/193 |
| 4,987,965 A * | 1/1991 | Bourret | 180/193 |
| 6,206,124 B1 * | 3/2001 | Mallette et al. | 180/193 |
| 6,889,987 B2 * | 5/2005 | Ouellette | 280/9 |
| 2005/0016784 A1 * | 1/2005 | Fecteau | 180/182 |

* cited by examiner

*Primary Examiner*—Kevin Hurley
(74) *Attorney, Agent, or Firm*—Osler, Hoskin & Harcourt LLP

(57) ABSTRACT

A suspension assembly for a vehicle having an endless drive track is disclosed. The suspension assembly has a slide frame assembly and a rail extension assembly pivotably connected to a rear portion of the slide frame assembly and pivots about a first axis. The rail extension assembly is pivotable between a raised position and a lowered position with respect to the slide frame assembly. A spring biases the rail extension assembly toward the lowered position. The magnitude of the biasing force of the spring is adjustable. The rail extension assembly can be prevented from pivoting from the lowered position to the raised position independently of the magnitude of the biasing force.

6 Claims, 9 Drawing Sheets